United States Patent
Sato et al.

(10) Patent No.: US 9,851,483 B2
(45) Date of Patent: Dec. 26, 2017

(54) STEREOSCOPIC IMAGING METHOD AND SYSTEM THAT DIVIDES A PIXEL MATRIX INTO SUBGROUPS

(75) Inventors: Shuzo Sato, Kanagawa (JP); Eiji Otani, Kanagawa (JP); Ken Ozawa, Kanagawa (JP); Seiji Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 468 days.

(21) Appl. No.: 13/502,907

(22) PCT Filed: Aug. 24, 2011

(86) PCT No.: PCT/JP2011/004695
§ 371 (c)(1),
(2), (4) Date: Apr. 19, 2012

(87) PCT Pub. No.: WO2012/029251
PCT Pub. Date: Mar. 8, 2012

(65) Prior Publication Data
US 2012/0206576 A1 Aug. 16, 2012

(30) Foreign Application Priority Data

Sep. 3, 2010 (JP) .................................. 2010-197484

(51) Int. Cl.
*G03B 35/08* (2006.01)
*G03B 35/10* (2006.01)
(Continued)

(52) U.S. Cl.
CPC ........... *G02B 5/3058* (2013.01); *G03B 35/08* (2013.01); *G03B 35/26* (2013.01); *H04N 13/0217* (2013.01); *H04N 13/0257* (2013.01)

(58) Field of Classification Search
CPC .................................. G03B 35/00; G03B 35/10
(Continued)

(56) References Cited

U.S. PATENT DOCUMENTS 6,807,295 B1 * 10/2004 Ono .............................. 382/154
7,085,410 B2 * 8/2006 Redert ........................... 382/154
(Continued)

FOREIGN PATENT DOCUMENTS

CN 202750183 U 2/2013
JP 64-054438 3/1989
(Continued)

OTHER PUBLICATIONS https://web.archive.org/web/20090109092443/http://en.wikipedia.org/wiki/Color_depth.*
(Continued)

*Primary Examiner* — James Pontius
*Assistant Examiner* — Kyle Lotfi
(74) *Attorney, Agent, or Firm* — Michael Best & Friedrich LLP

(57) ABSTRACT

A stereoscopic imaging method where a pixel matrix is divided into groups such that parallax information is received by one pixel group and original information is received by another pixel group. The parallax information may, specifically, be based on polarized information received by subgroups of the one pixel, group and by processing all of the information received multiple images are rendered by the method.

25 Claims, 14 Drawing Sheets

(51) Int. Cl.
  *G02B 5/30* (2006.01)
  *G03B 35/26* (2006.01)
  *H04N 13/02* (2006.01)
(58) Field of Classification Search
  USPC ............................... 348/40, 49, 42; 396/324
  See application file for complete search history.

(56) References Cited

U.S. PATENT DOCUMENTS

| | | | | |
|---|---|---|---|---|
| 2004/0201888 | A1* | 10/2004 | Hagita | ........................... 359/462 |
| 2006/0095207 | A1* | 5/2006 | Reid | ....................... G01S 11/12 |
| | | | | 701/301 |
| 2012/0133743 | A1* | 5/2012 | Hiramoto | ........... H04N 13/0214 |
| | | | | 348/46 |

FOREIGN PATENT DOCUMENTS

| | | |
|---|---|---|
| JP | 06-54991 | 3/1994 |
| JP | 2001-016611 | 1/2001 |
| JP | 2004-309868 | 11/2004 |
| JP | 2010-268444 | 11/2010 |

OTHER PUBLICATIONS

PCT International Search Report; International Application No. PCT/JP2011/004695; Filing Date: Aug. 24, 2011.

PCT Notification of Transmittal of the International Search Report and the Written Opinion of the International Searching Authority, or the Declaration; International Application No. PCT/JP2011/004695; Filing Date: Aug. 24, 2011, dated Nov. 15, 2011.

PCT Written Opinion of the International Searching Authority; International Application No. PCT/JP2011/004695; Filing Date: Aug. 24, 2011, dated Nov. 15, 2011.

Chinese Office Action dated Sep. 29, 2014 for corresponding Chinese Application No. 201110254543.2.

\* cited by examiner

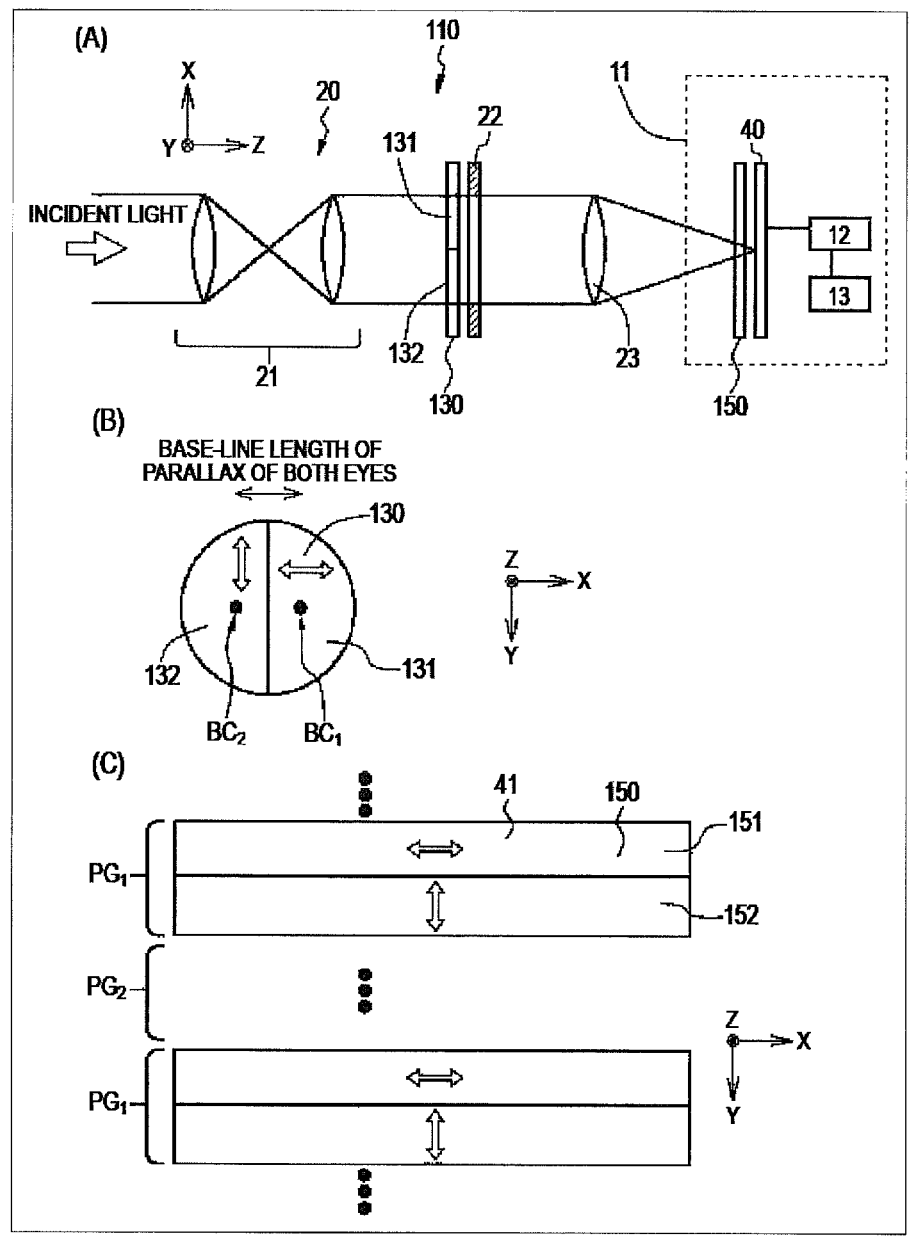

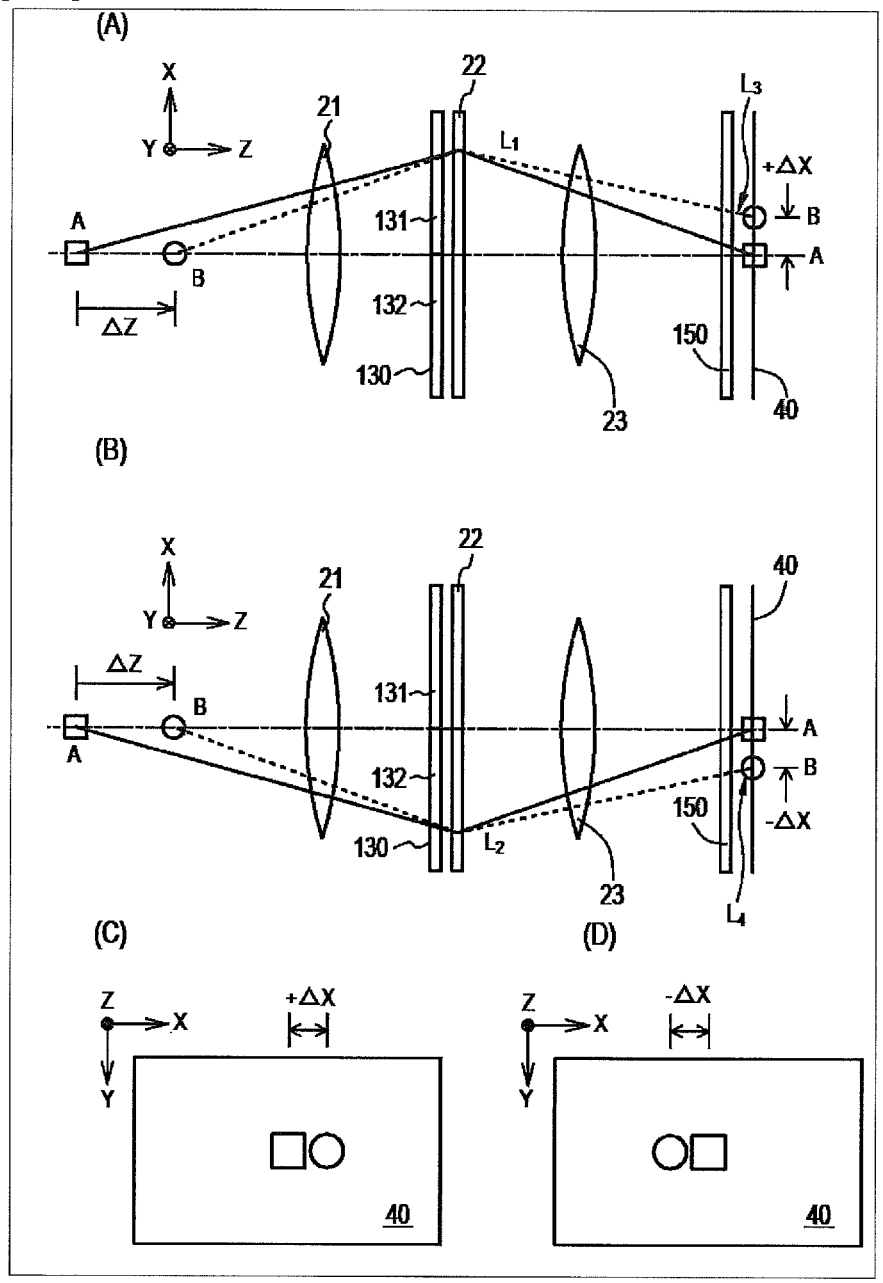
[FIG.2]

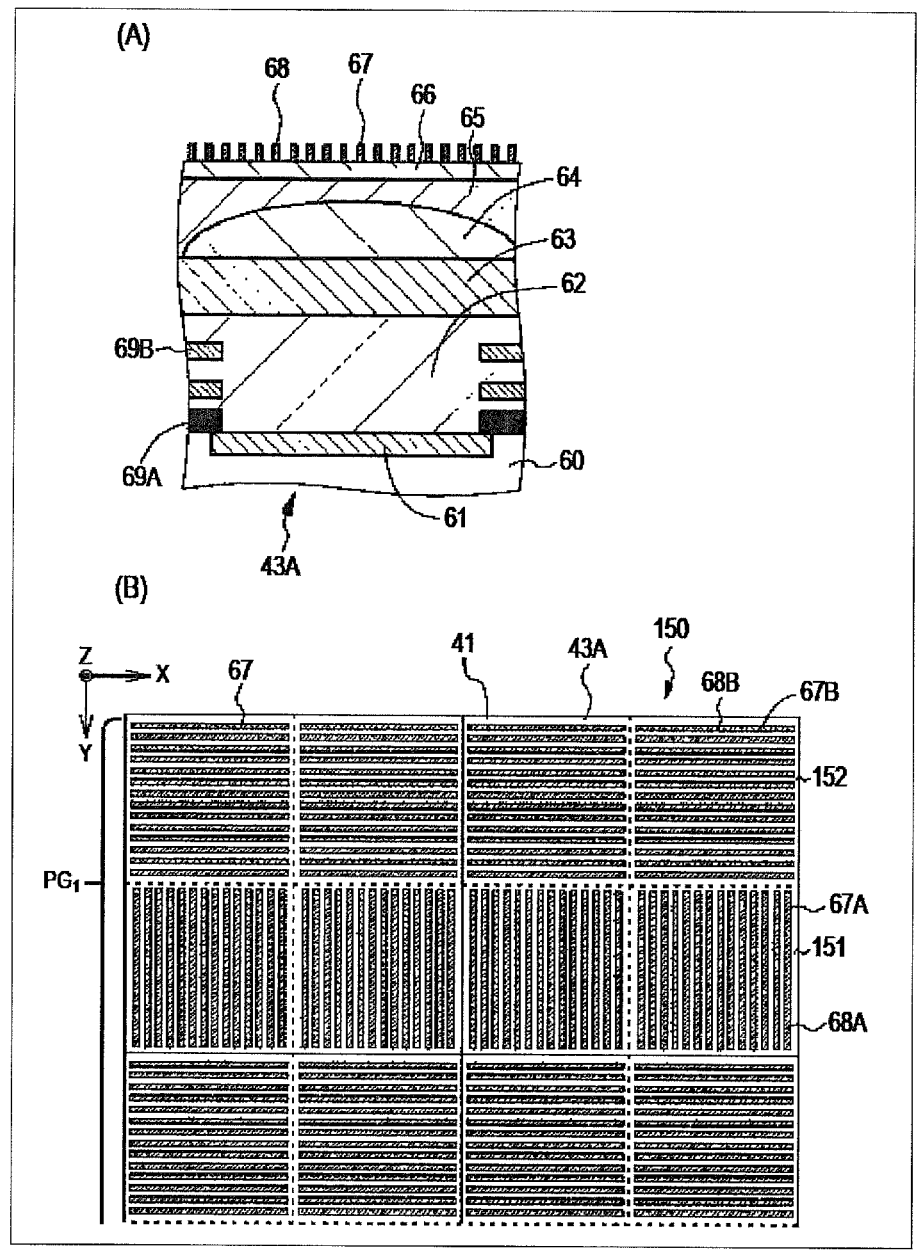

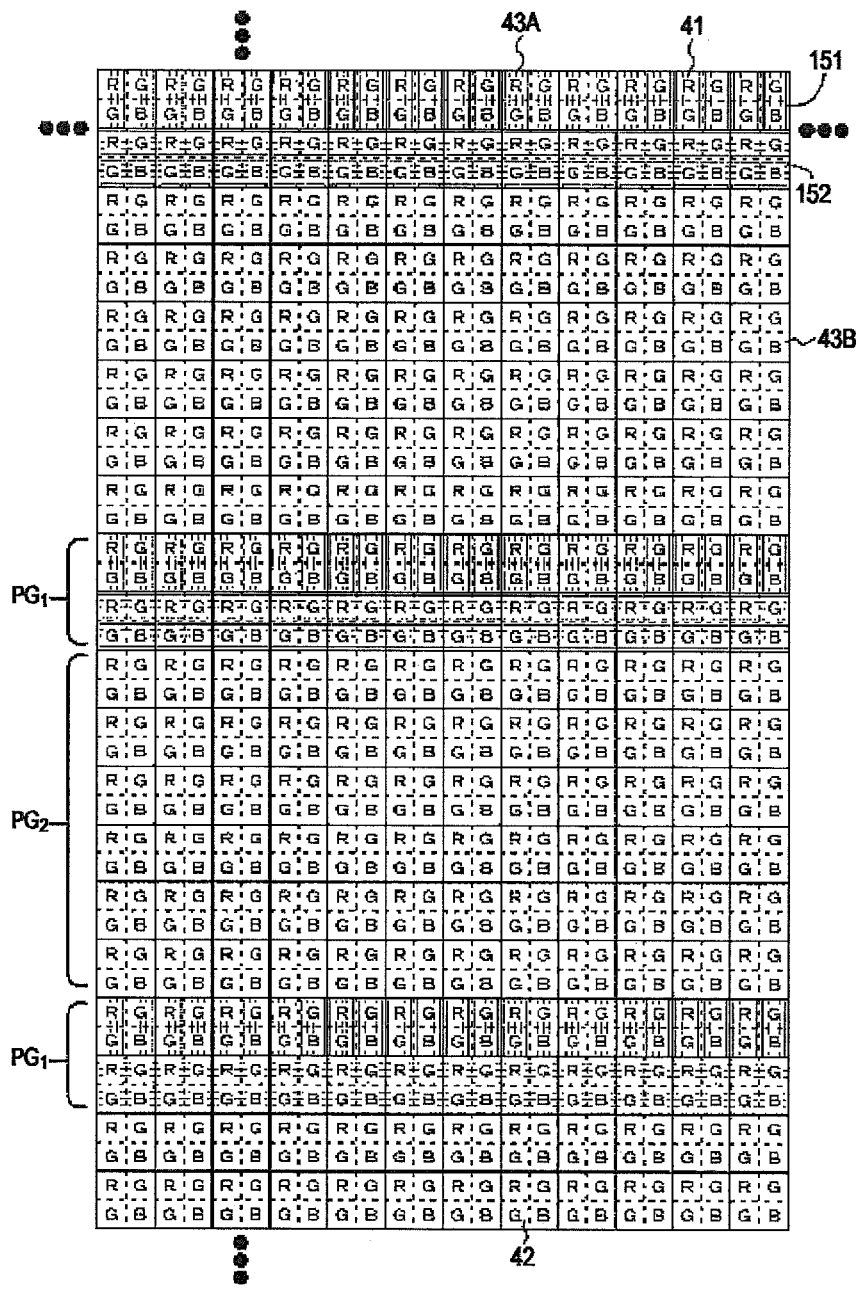
[FIG.4] (EMBODIMENT 1)

[FIG.5]
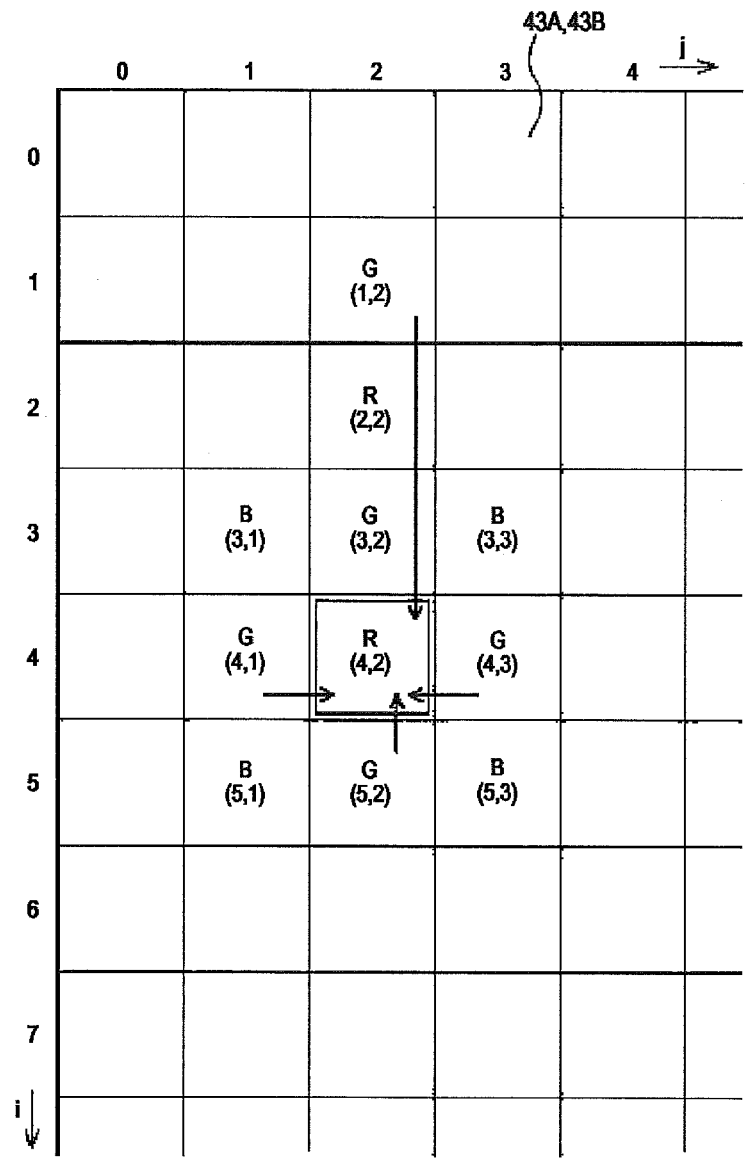

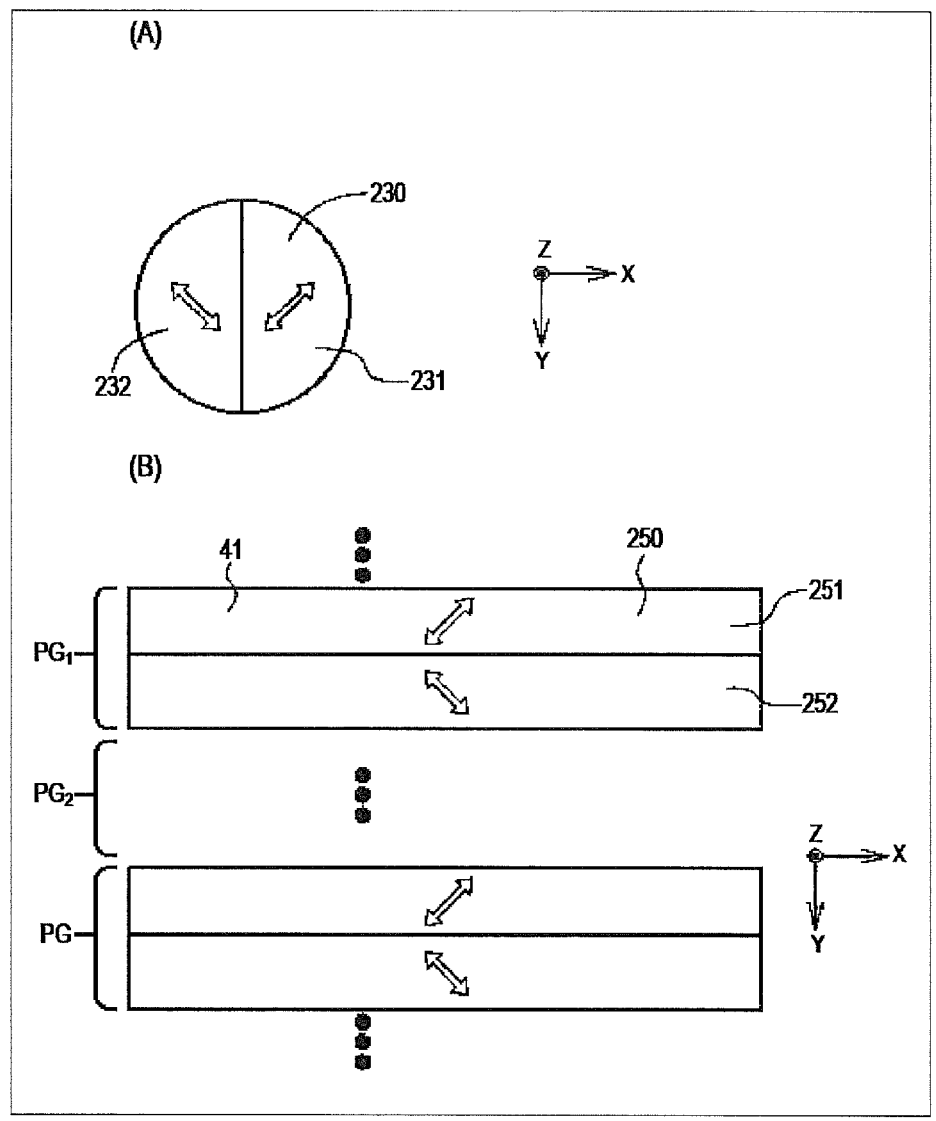

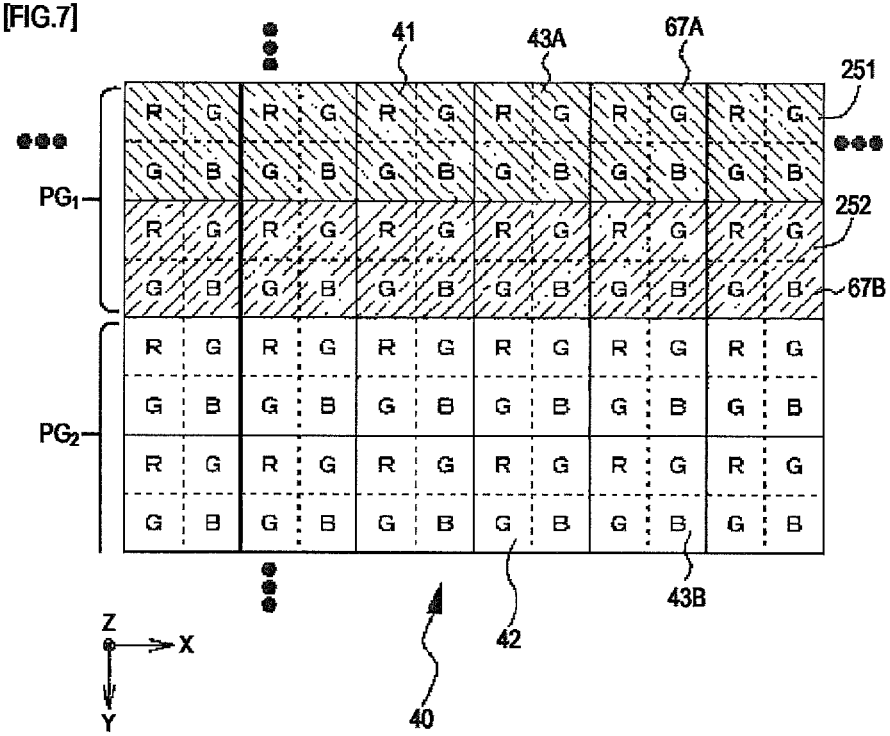

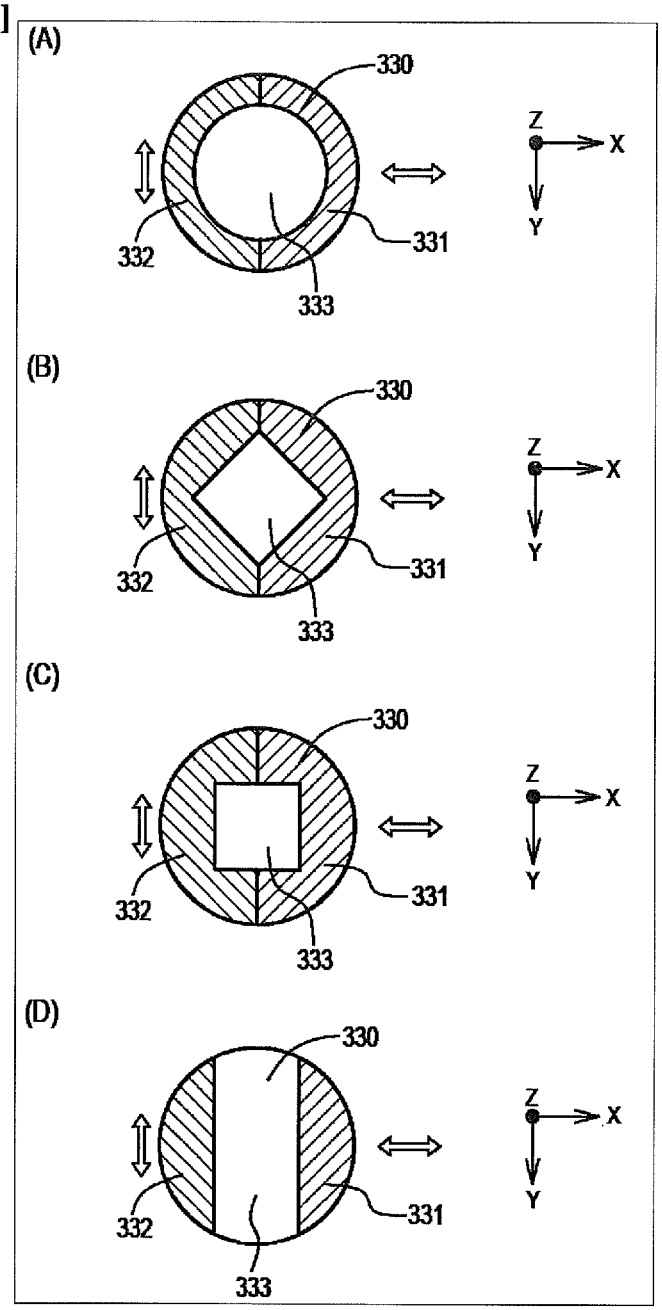

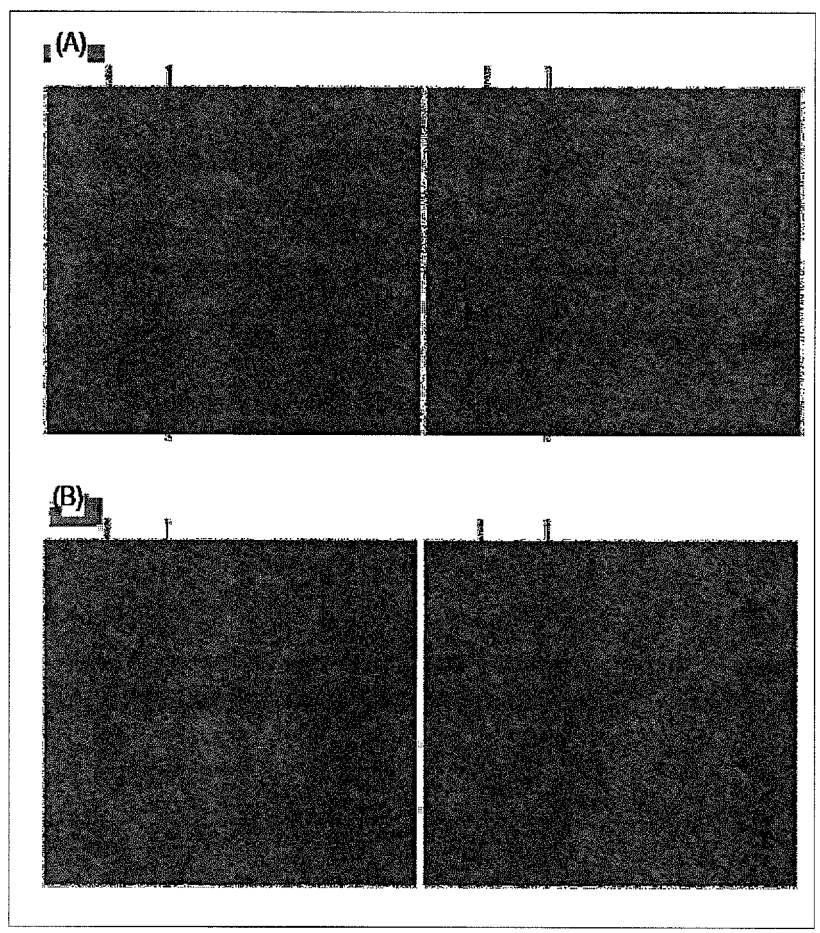
[FIG.9]

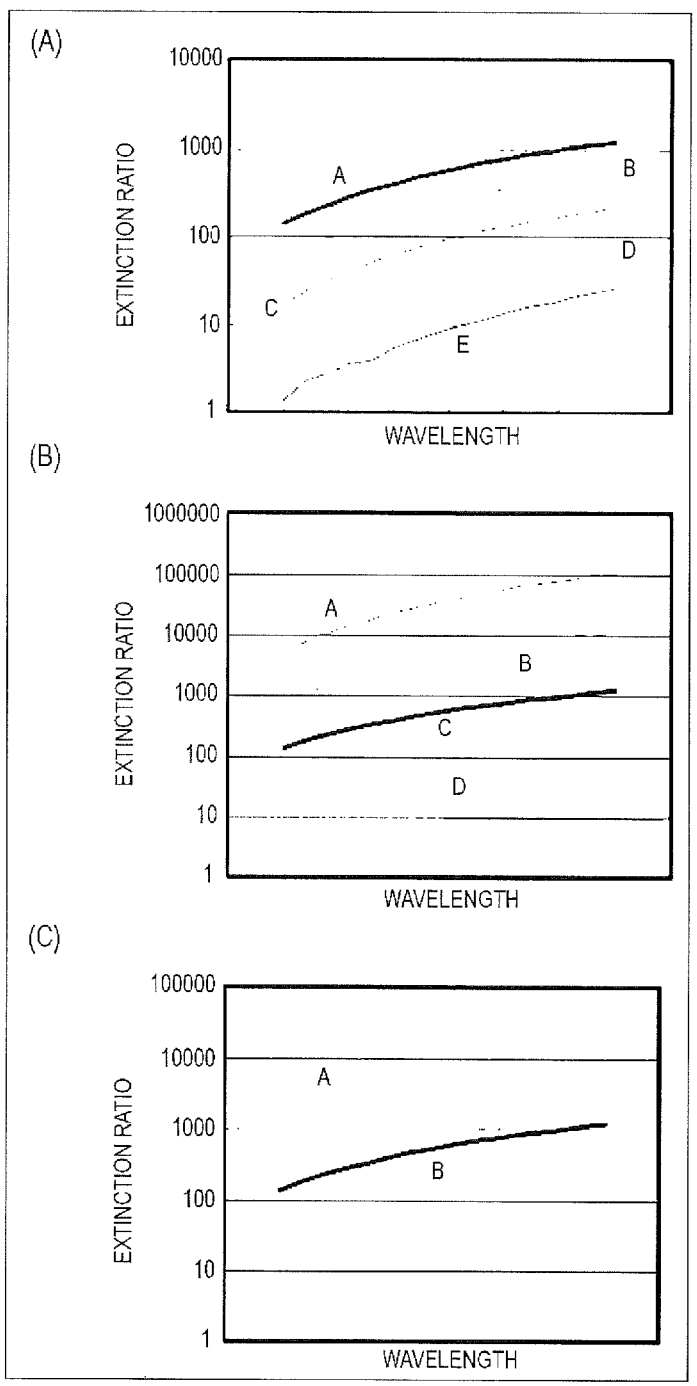

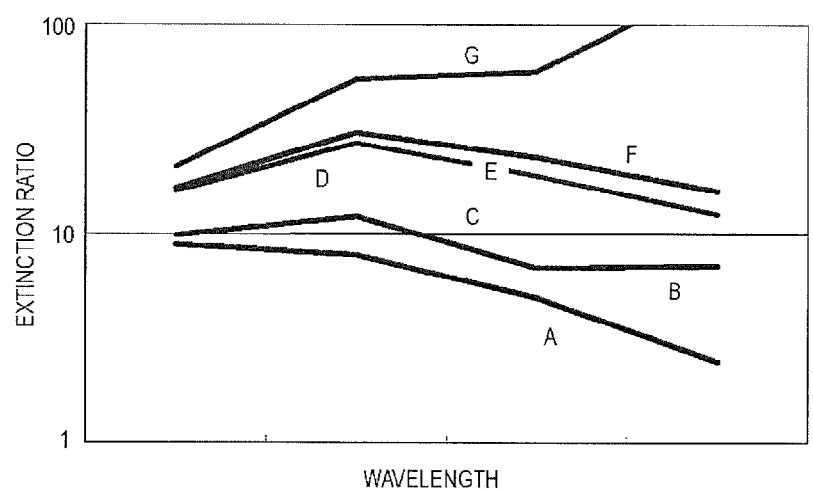
[FIG.11]

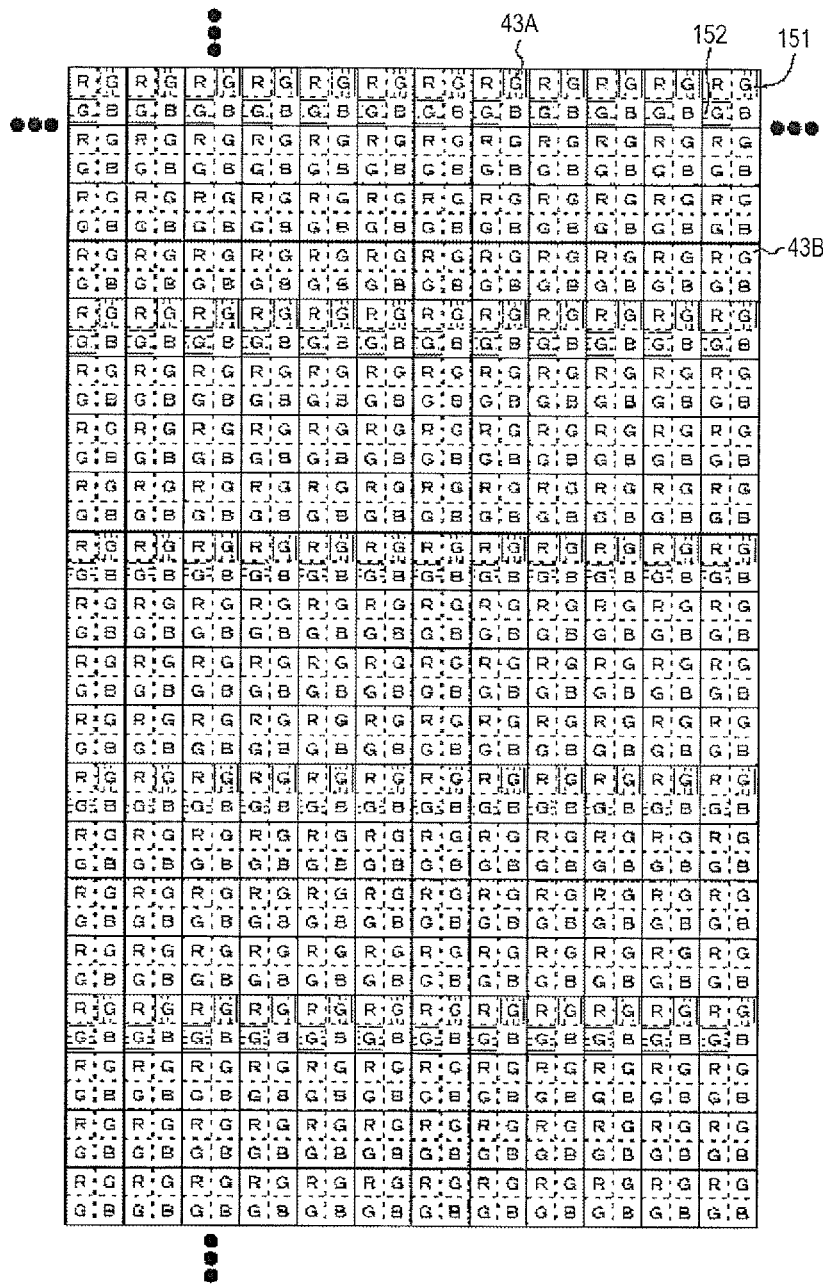
[FIG.12] (EMBODIMENT 6)

[FIG.13]
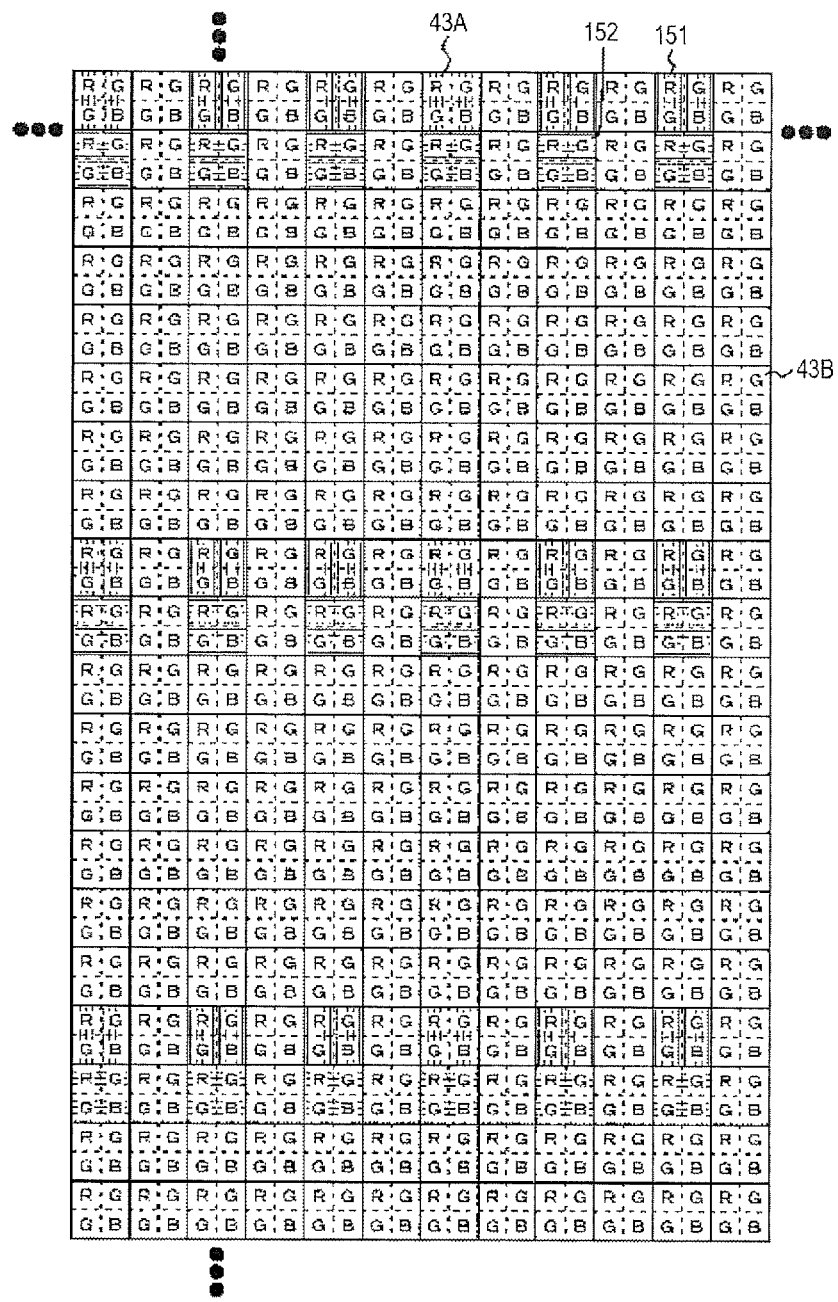

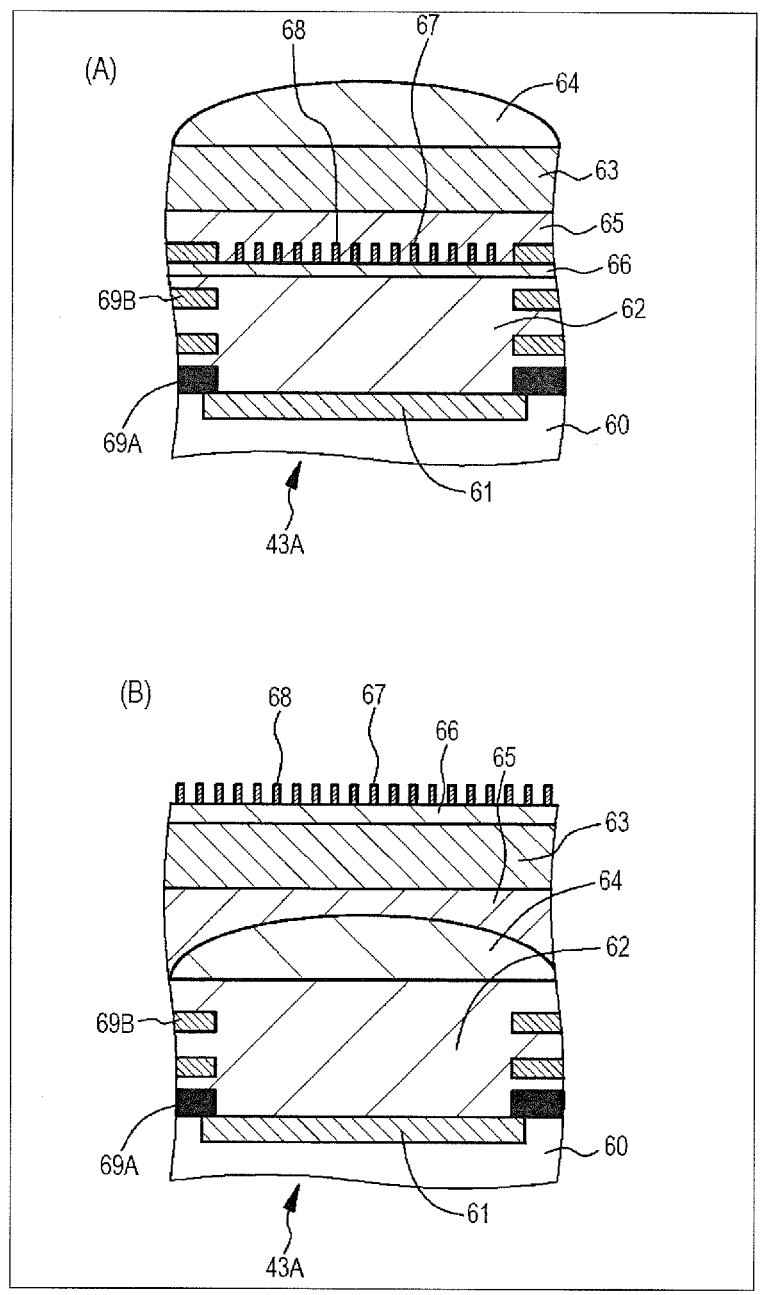
[FIG.14]

STEREOSCOPIC IMAGING METHOD AND SYSTEM THAT DIVIDES A PIXEL MATRIX INTO SUBGROUPS

TECHNICAL FIELD

The present invention relates to an imaging method, and more specifically, to an imaging method for imaging a subject as a stereoscopic image.

BACKGROUND ART

In the related art, a system is proposed in which two video cameras that are arranged left and right simultaneously image a common subject and the obtained two kinds of images (a right-eye image and a left-eye image) are output to be displayed as a stereoscopic image. In addition, a stereoscopic capturing device is suggested in which an optical system is shared by combining polarization filters that perform polarization so as to be placed in an orthogonal relationship to each other in order to easily adjust a lens system for performing stereoscopic capturing (for example, refer to JP-B-6-054991).

In addition, a method is proposed which aims to perform stereoscopic capturing with an imaging device composed of two lenses and one imaging means (for example, refer to JP-A-2004-309868). The imaging device disclosed in the Japanese Examined Patent Application Publication includes imaging means having pixels arranged on an imaging plane to the number corresponding to integer times of a predetermined number of scanning lines; first horizontal component polarizing means adapted to transmit only a horizontal component of light of a first optical image from a subject; and first vertical component polarizing means arranged at a position separated from the first horizontal component polarizing means by a predetermined distance and adapted to transmit only a vertical component of light of a second optical image from the subject, wherein the horizontal component transmitted by the first horizontal component polarizing means is converged to the pixels in a predetermined area on the imaging plane; and the vertical component transmitted by the first vertical component polarizing means is converged to the pixels in the remaining area excluded from the predetermined area. Specifically, a horizontal component polarizing filter and a vertical component polarizing filter arranged separate as far as an interval according to the parallax of a person are provided with two lenses at a position apart from a predetermined distance from an imaging plane of a CCD.

CITATION LIST

Patent Literature

[PTL 1] JP-B-6-054991
[PTL 2] JP-A-2004-309868

SUMMARY OF INVENTION

Technical Problem

However, in the technology disclosed in JP-B-6-054991, the lens system is shared by overlapping the outputs of two polarization filters and then combining the optical paths thereof. However, it is necessary to provide another polarization filter in the lower part to extract a right-eye image and a left-eye image and to make light incident to each polarization filter by dividing the optical paths again. In the technology disclosed in JP-A-2004-309868, two pairs of the combination of a lens and a polarization filter are necessary. For this reason, in such an imaging device, the optical axes of the optical paths, focal length, transmittance, F-number, zoom, diaphragms, focus, convergence angle, and the like of the two pairs have to completely correspond to each other, and it is difficult to suppress the occurrence of visual field competition. Herein, visual field competition refers to a phenomenon in which, for example, when a subject such as a water surface, a window, or the like that reflects P-wave components but absorbs S-wave components is imaged, and when an image obtained from P-wave components and an image obtained from S-wave components are present to both eyes, fusion of the images does not occur in the case where the luminance thereof is remarkably different, images are shown alternately due to the fact that only one image is superior, or images suppress each other in overlapping areas. In addition, since several polarization filters are used, there is a problem in that the amount of light that reaches the imaging means (imaging element) drastically decreases.

Therefore, the objective of the present invention is to provide an imaging method that can suppress the occurrence of visual field competition, and prevent drastic reduction in the amount of light that reaches the imaging elements.

Solution to Problem

Thus, an object is to provide a parallax imaging method, comprising receiving a parallax information by a first pixel group of a pixel matrix; receiving an original information by a second pixel group of the pixel matrix, wherein the parallax information is calculated based on a first polarized information that is received by a first pixel subgroup of the first pixel group and a second polarized information that is received by a second pixel subgroup of the first pixel group; and processing the original information with the first parallax information and the second parallax information to respectively render a first image and a second image. The first pixel group of the pixel matrix may include at least a pixel row, and the second pixel group of the pixel matrix may comprise of pixel rows not included in the first pixel group.

Further, the first pixel group of the pixel matrix may include at least a pixel row for every N-th row, where N≥2, and the second pixel group of the pixel matrix may comprise pixel rows not equal to every N-th row. An upper limit of N may be
N=2^n, where n is a natural number from 1 to 5 and, specifically n may equal 3.

Furthermore, a direction of an electronic field of the first polarized information may be orthogonal to a direction of an electronic field of the second polarized information.

Another object is to provide a parallax image apparatus that may comprise a set of pixels disposed in a matrix, a first image pixel group of the set of pixels for receiving original information; and a second image pixel group of the set of pixels for receiving a parallax information, wherein the original information received by the first image pixel group is converged light that passes a first polarization means and a second polarization means and the first image pixel group converts the converged light to electrical signals, wherein the parallax information received by the second image pixel group is converged light that passes a first polarization means and the second image pixel group converts the converged light to electrical signals, and a processor for processing the original information with the parallax information to render a first image and a second image. The apparatus may be one of a digital camera, a personal computer, a mobile terminal equipment, a video camera, or a game machine.

Another object is to provide a parallax imaging system that may comprise a set of pixels disposed in a matrix, a first image pixel group of the set of pixels for receiving original information; and a second image pixel group of the set of pixels for receiving a parallax information, wherein the original information received by the first image pixel group is converged light that passes a first polarization means and a second polarization means and the first image pixel group converts the converged light to electrical signals, wherein the parallax information received by the second image pixel group is converged light that passes a first polarization means and the second image pixel group converts the converged light to electrical signals, wherein the first polarization means has a first area and a second area arranged along a first direction, and wherein the second polarization means has a third area and a forth area arranged along a second direction.

Another object is to provide a parallax imaging apparatus that may comprise a first image pixel group for receiving original information; and a second image pixel group for receiving a parallax information, wherein the original information received by the first image pixel group is converged light that passes a first polarization means and a second polarization means and the first image pixel group converts the converged light to electrical signals, wherein the parallax information received by the second image pixel group is converged light that passes a first polarization means and the second image pixel group converts the converged light to electrical signals, wherein the first polarization means has a first area and a second area arranged along a first direction, and wherein the second polarization means has a third area and a forth area arranged along a second direction.

Another object is to provide a non-transitory computer readable medium storing program code that when executed by a computer performs an parallax imaging process in a parallax system comprising a set of pixels disposed in a matrix, wherein the set of pixels has a first pixel group and a second pixel group, where the process may comprise receiving a parallax information by the first pixel group of a pixel matrix; receiving an original information by the second pixel group of the pixel matrix, wherein the parallax information is calculated based on a first polarized information that is received by a first pixel subgroup of the first pixel group and a second polarized information that is received by a second pixel subgroup of the first pixel group; and processing the original information with the first parallax information and the second parallax information to respectively render a first and second image.

BRIEF DESCRIPTION OF DRAWINGS (A), (B), and (C) of FIG. 1 are respectively a conceptual diagram of an imaging device of Embodiment 1 and diagrams schematically showing polarization states in a first polarization means and a second polarization means.

(A) and (B) of FIG. 2 are respectively a conceptual diagram of light that passes a first area in the first polarization means and a third area in the second polarization means and reaches an imaging element array, and a conceptual diagram of light that passes a second area in the first polarization means and a fourth area in the second polarization means and reaches the imaging element array in the imaging device of Embodiment 1, and (C) and (D) of FIG. 2 are diagrams schematically showing images formed in the imaging element array by light shown in (A) and (B) of FIG. 2.

(A) and (B) of FIG. 3 are respectively a schematic partial cross-sectional diagram of an imaging element and a diagram schematically showing an arrangement state of wire-grid polarizers according to the imaging device of Embodiment 1.

FIG. 4 is a conceptual diagram of an imaging element array with a Bayer arrangement in the imaging device of Embodiment 1.

FIG. 5 is a conceptual diagram of the imaging element array with a Bayer arrangement to perform a demosaicing process for electronic signals obtained from imaging elements and to describe an image process for obtaining signal values.

(A) and (B) of FIG. 6 are respectively diagrams each schematically showing polarization states in a first polarization means and a second polarization means provided in an imaging device of Embodiment 2.

FIG. 7 is a conceptual diagram of an imaging element array with a Bayer arrangement in the imaging device of Embodiment 2.

(A) to (D) of FIG. 8 are schematic diagrams of a first polarization means provided in an imaging device of Embodiment 3.

(A) and (B) of FIG. 9 are diagrams substituting photographs of left-eye images and right-eye images showing a result of the relationship between an extinction ratio and parallax in Embodiment 4.

(A), (B), and (C) of FIG. 10 are graphs each showing results of the relationship between a pitch of wires composing a wire-grid polarizer, a wavelength of incident light, and an extinction ratio, the relationship between the height of the wires composing the wire-grid polarizer, the wavelength of incident light, and the extinction ratio, and the relationship between the (width/pitch) of the wires composing the wire-grid polarizer, the wavelength of incident light, and the extinction ratio in Embodiment 5.

FIG. 11 is a graph showing the result of the relationship between the length of two wires composing the wire-grid polarizer, the wavelength of incident light, and the extinction ratio in Embodiment 5.

FIG. 12 is a conceptual diagram of an image element array with a Bayer arrangement in an imaging device of Embodiment 6.

FIG. 13 is a conceptual diagram of an image element array with a Bayer arrangement in a modified example of the imaging device of Embodiment 6.

(A) and (B) of FIG. 14 are respectively schematic partial cross-sectional diagrams of an image element in the modified example.

DESCRIPTION OF EMBODIMENTS

Hereinbelow, the present invention will be described based on the Embodiments with reference to the drawings, but the invention is not limited to the Embodiments, and the various numeric values and materials in the Embodiments are examples. Furthermore, description will be provided in the following order.

1. Imaging Method of the Present Invention and General Description

2. Embodiment 1 (Imaging method of the present invention)

3. Embodiment 2 (Modification of Embodiment 1)
4. Embodiment 3 (Another modification of Embodiment 1)
5. Embodiment 4 (Another modification of Embodiment 1)
6. Embodiment 5 (Another modification of Embodiment 1)
7. Embodiment 6 (Another modification of Embodiment 1), and Others

IMAGING METHOD OF THE PRESENT INVENTION, AND GENERAL DESCRIPTION

The value of N is not limited in the imaging method of the invention, but the value is set to an integer equal to or greater than 2, and the upper limit can be $2^5$. Alternatively, the value of N is not limited in the imaging method of the invention, but $N=2^n$, and n can be a natural number from 1 to 5.

In the imaging method of the invention with the preferable configuration described above, an optical system includes:

(a) a first polarization means which polarizes light from a subject, and;

(b) a lens system which converges light from the first polarization means, in which a first image element group has a second polarization means in the side of the light incidence, and converts light converged by the lens system to electrical signals (to be more specific, the first image element group converts light that is converged by the lens system and passes the first polarization means and the second polarization means to electrical signals), a second image element group converts light that is converged by the lens system to electrical signals (to be more specific, the second image element group converts light that is converged by the lens system and passes the first polarization means to electrical signals), the first polarization means has a first area and a second area arranged along a first direction, a polarization state of a first area passing light that passes the first area and a polarization state of a second area passing light that passes the second area are different, the second polarization means has a plurality of third and fourth areas extending in the first direction, a polarization state of a third area passing light that passes the third area and a polarization state of a fourth area passing light that passes the fourth area are different, the first area passing light passes the third area and reaches the first image element group, the second area passing light passes the fourth area and reaches the first image element group, and accordingly, parallax information can be obtained in which a distance between the barycenter of the first area and the barycenter of the second area is set to a base-line length of parallax of both eyes. Furthermore, an imaging device including an optical system with the above embodiment may be called "an imaging device in the present invention" for the sake of convenience.

According to the imaging device in the invention, since the imaging device is composed of one pair of the first polarization means and the second polarization means, and one lens system, it is possible to provide an imaging device which is monocular, small, and has a simple configuration and structure. In addition, since two pairs of the combination of a lens and a polarization filter are not necessary, no deviations or differences occur in zoom, diaphragms, focus, convergence angle, or the like. Moreover, since the base-line length of the parallax of both eyes is relatively short, a natural stereoscopic effect can be obtained. Furthermore, two-dimensional images or three-dimensional images can be easily obtained by attaching or detaching the first polarization means.

Herein, according to the imaging device of the invention, it is preferable to employ an embodiment that the first polarization means is arranged around the diaphragm of the lens system. Alternatively, when light incident to the lens system is once assumed to be parallel light, and finally converged (forms image) on an imaging element, it is preferable to arrange the first polarization means in the lens system portion being in the state of parallel light. In such an embodiment, generally, it is not necessary to re-design the optical system of the lens system, and a change can be performed in mechanical (physical) design by fixing the first polarization means to the existing lens system or attaching the first polarization means detachably. Furthermore, in order to attach the first polarization means on the lens system detachably, for example, the first polarization means may be configured or structured to be similar to diaphragm blades and arranged within the lens system. Alternatively, the lens system can be configured or structured such that a member provided with the first polarization means and an opening together is attached to a rotary axis so that the member can rotate around the rotary axis parallel with the optical axis of the lens system, and a light beam passing through the lens system passes the opening by rotating the member around the rotary axis, or passes the first polarization means. Alternatively, the lens system can be configured or structured such that the member provided with the first polarization means and the opening together is attached slidably to the lens system in a direction orthogonal to, for example, the optical axis of the lens system, and a light beam passing through the lens system passes the opening or passes the first polarization means by sliding the member.

According to the imaging device of the invention with the preferable embodiment described above, in the first polarization means, a center area is provided between the first area and the second area, and a polarization state of a center area passing light that passes the center area can be configured not to change from a state before being incident in the center area. In other words, the center area can be in a free-passing state of polarization. In the center area of the first polarization means, light intensity is strong, but a parallax amount is small. Therefore, by employing such an embodiment, it is possible to increase the light intensity that the image element array receives, and to secure a sufficient base-line length of the parallax of both eyes. When the external shape of the first polarization means is circular, the center area can be shaped to be circular, the first area and the second area can be a fan shape of which the central angle surrounding the center area is 180 degrees, the center area can be a square or a rhombus shape, and the first area and the second area can be shaped similar to a fan shape of which the central angle surrounding the center area is 180 degrees. Alternatively, the first area, the center area, and the second area can be a strip shape elongating along a second direction.

According to the imaging device in the invention with various preferable embodiments described above, the first area and the second area are constituted by polarizers, and the direction of an electric field of the first area passing light and the direction of an electric field of the second area passing light can be configured to be orthogonal to each other. In addition, according to the imaging device of the invention with such a configuration, the direction of the electric field of the first area passing light can be configured to be parallel with the first direction, or the direction of the electric field of the first area passing light can be configured to form the angle of 45 degrees with the first direction. Furthermore, in the imaging device of the invention including an arbitrary combination of such configurations, the direction of the electric field of the first area passing light and the direction of an electric field of the third area passing light can be parallel with each other, and the direction of the electric field of the second area passing light and the direction of an electric field of the fourth area passing light can be parallel with each other. Moreover, in the imaging device of the invention including an arbitrary combination of such configurations, it is desirable that an extinction ratio of the polarizers is 3 or greater, and preferably 10 or greater.

Herein, a "polarizer" refers to a device that converts natural light (non-polarized light) or circularly-polarized light into linearly-polarized light, and polarizers constituting the first area and the second area themselves may be polarizers (polarizing plate) with a known configuration and structure. In addition, for example, a polarization component of one of the first area passing light or the second area passing light may mostly be set to an S-wave (TE wave), and a polarization component of the other one of the first area passing light or the second area passing light may mostly be set to a P-wave (TM wave). A polarization state of the first area passing light and the second area passing light may be linear polarization, or circular polarization (however, rotation directions of the light are opposed to each other). Generally, a horizontal wave of which the oscillating direction is only a specific direction is called a polarized wave, and the oscillating direction is called a polarization direction or a polarization axis. The direction of an electric field of light coincides with the polarization direction. An extinction ratio is a ratio between a light component of which the direction of the electric field is the first direction and a light component of which the direction of the electric field is the second direction included in light passing the first area in the first area, and a ratio between a light component of which the direction of the electric field is the second direction and a light component of which the direction of the electric field is the first direction included in light passing the second area in the second area when the direction of the electric field of the first area passing light is parallel with the first direction. In addition, when the direction of the electric field of the first area passing light is configured to form the angle of 45 degrees with the first direction, the extinction ratio is a ratio between a light component of which the direction of the electric field forms the angle of 45 degrees with the first direction and a light component of which the direction of the electric field forms the angle of 135 degrees with the first direction included in the light passing the first area in the first area, and a ratio between a light component of which the direction of the electric field forms the angle of 135 degrees with the first direction and a light component of which the direction of the electric field forms the angle of 45 degrees with the first direction included in the light passing the second area in the second area. Alternatively, for example, when a polarization component of the first area passing light is mostly the P-wave and a polarization component of the second area passing light is mostly the S-wave, the extinction ratio is a ratio between a P polarization component and an S polarization component included in the first area passing light in the first area, and a ratio between an S polarization component and a P polarization component included in the second area passing light in the second area.

In the imaging device of the invention with the various embodiments and configurations described above, an imaging element composing the first imaging element group is composed of a photoelectric conversion element, and a color filter, an on-chip lens, and a wire-grid polarizer stacked on or above the element, and the wire-grid polarizer can be configured to constitute the third area or the fourth area. Alternatively, the imaging element composing the first imaging element group is composed of a photoelectric conversion element, and a wire-grid element, a color filter, and an on-chip lens stacked on or above the element, and the wire-grid polarizer can be configured to constitute the third area or the fourth area. Alternatively, the imaging element is composed of a photoelectric conversion element, and an on-chip lens, a color filter, and a wire-grid polarizer stacked on or above the element, and the wire-grid polarizer can be configured to constitute the third area or the fourth area. However, the stacking order of the on-chip lens, the color filter, and the wire-grid polarizer can be appropriately changed. In addition, in these embodiments, when the direction of the electric field of the first area passing light is parallel with the first direction, the direction in which a plurality of wires composing the wire-grid polarizer extends can be parallel with the first direction or the second direction. Specifically, in a wire-grid polarizer constituting the third area, the direction in which wires extend is parallel with the second direction, and in a wire-grid polarizer constituting the fourth area, the direction in which wires extend is parallel with the first direction. Alternatively, in such embodiments, when the direction of the electric field of the first area passing light forms the angle of 45 degrees with the first direction, the direction in which the plurality of wires constituting a wire-grid polarizer extends can form the angle of 45 degrees with the first direction or the second direction. To be more specific, in the wire-grid polarizer constituting the third area, the direction in which the wires extend forms the angle of 135 degrees with the first direction and in the wire-grid polarizer constituting the fourth area, the direction in which the wires extend forms the angle of 45 degrees with the first direction. The direction in which the wires extend is a light absorbing axis in the wire-grid polarizer, and the direction orthogonal to the direction in which the wires extend is a light transmitting axis in the wire-grid polarizer. Furthermore, an imaging element composing the second imaging element group can be configured or structured to be the same as the imaging element composing the first imaging element group except that a wire-grid polarizer is not provided.

In the imaging device of the invention with the various preferable embodiments and configuration described above, the imaging element array has a Bayer arrangement, and one pixel can be composed of four imaging elements. In addition, in a first pixel group, one third area and/or fourth area can be arranged for one pixel. In other words, an embodiment where one third area is arranged, one fourth area is arranged, or one third area and one fourth area are arranged for one pixel can be configured. Alternatively, in the imaging device of the invention with the various embodiments and configuration described above, it can be configured such that the first pixel group is constituted by two unit pixel rows, the third area is arranged in one of the unit pixel row, and the fourth area is arranged in the other one of the unit pixel. Alternatively, it can be configured such that the first pixel group is constituted by one unit pixel row, and the third area and the fourth area are arranged in the one unit pixel row. However, the arrangement of the imaging element array is not limited to a Bayer arrangement, and other arrangements such as an interline arrangement, a G-striped and RB-checkered arrangement, a G-striped and RB-complete-checkered arrangement, a checkered complementary-color arrangement, a stripe arrangement, an oblique-stripe arrangement, a primary-color color-difference arrangement, a field color-difference sequence arrangement, a frame color-difference sequence arrangement, an MOS arrangement, a modified MOS arrangement, a frame interleaved arrangement, and a field interleaved arrangement can be exemplified.

Alternatively, when the arrangement of the imaging element array is set to a Bayer arrangement in the first pixel group, in one pixel, a red imaging element sensing red and a blue imaging element sensing blue are not arranged with the third area and the fourth area, but one of two green imaging elements sensing green may be arranged with the third area, and the other may be arranged with the fourth area. Alternatively, when the arrangement of the imaging element array is set to a Bayer arrangement in the first pixel group, in one pixel, two imaging elements (for example, one red imaging element sensing red and one of two green imaging elements sensing green) adjacent to the first direction among the red imaging element sensing red, one blue imaging element sensing blue, and the two green imaging elements sensing green may be arranged with the third area or the fourth area, and remaining two imaging elements (for example, the blue imaging element sensing blue and the other green imaging element sensing green) may be arranged with the fourth area or the third area. Alternatively, when the arrangement of the imaging element array is set to a Bayer arrangement in the first pixel group, in one pixel, any one imaging element (for example, one red imaging element sensing red or one blue imaging elements sensing blue) among the one red imaging element sensing red, the one blue imaging element sensing blue, and two green imaging elements sensing green may be arranged with the third area or the fourth area, and an imaging element (for example, the green imaging element) adjacent to the second direction among the imaging elements may be arranged with the fourth area or the third area.

The number of unit pixel rows constituting the first pixel group can be exemplified as one or two as described above, but is not limited thereto. Imaging elements constituting a pixel in the first pixel group are set to the first imaging element group, but imaging elements constituting all pixels in the first pixel group may be set to the first imaging element group, and imaging elements constituting a part of the pixels in the first pixel group may be the first imaging element group. In addition, an imaging element group constituted by imaging elements not included in the first imaging element group is set to the second imaging element group, but an imaging element group constituted by all imaging elements not included in the first imaging element group may be set to the second imaging element group.

In the imaging method of the invention with the various preferable embodiments and configurations described above (hereinbelow, it may be collectively referred to simply as "the present invention"), the first direction can be set to a horizontal direction and the second direction can be set to a vertical direction. In the first pixel group, unit lengths of the third area and the fourth area along the first direction may be, for example, equivalent to the length of imaging elements along the first direction (when the direction of the electric field of the first area passing light is in parallel with the first direction), or may be equivalent to the length of one imaging element (when the direction of the electric field of the first area passing light forms the angle of 45 degrees with the first direction). The lens system may include a single-focus lens, or a so-called zoom lens, and the configuration or structure of a lens or the lens system may be determined based on a specification required for the lens system. As an imaging element, signal-amplifying image sensor such as a CCD (Charge Coupled Device) element, a CMOS (Complementary Metal Oxide Semiconductor) image sensor, a CIS (Contact Image Sensor), and a CMD (Charge Modulation Device) can be exemplified. In addition, as the imaging device, a surface irradiation type solid-state imaging device or a rear surface irradiation type solid-state imaging device can be exemplified. Furthermore, for example, a digital still camera, a video camera, or a camcorder can be constituted by the imaging device and the like of the present invention. In addition, the imaging method of the invention can be applied to the technology disclosed in JP-A-2004-309868, or the like.

When the third area and the fourth area are constituted by a wire-grid polarizer, it is preferable that wires constituting the wire-grid polarizer are not limited, but formed of aluminum (Al) or an aluminum alloy, the value of a ratio of the width of a wire to the pitch of a wire [(the width of a wire)/(the pitch of a wire)] is 0.33 or greater, the height of a wire is $5 \times 10^{-8}$ m or greater, and the number of wires is 10 or more.

In the invention, the barycenter of the first area refers to the barycenter obtained based on the external shape of the first area, and the barycenter of the second area refers to the barycenter obtained based on the external shape of the second area. When the external shape of the first polarization means is set to be a circular shape with the radius r, and the first area and the second area are respectively set to be a semilunar shape that occupies half of the first polarization means, the distance between the barycenter of the first area and the barycenter of the second area can be obtained from a simple calculation of $$[(8r)/(3\pi)]-$$

Embodiment 1

Embodiment 1 relates to the imaging method of the invention, and more specifically to an imaging method for imaging a subject as a stereoscopic image.

A conceptual diagram of the imaging device of the invention appropriate for the execution of the imaging method of Embodiment 1 is shown in (A) of FIG. 1, polarization states in the first polarization means and the second polarization means are schematically shown in (B) and (c) of FIG. 1, a conceptual diagram of the light that passes through the lens system, the first area in the first polarization means and the third area in the second polarization means and reaches the imaging element array is shown in (A) of FIG. 2, a conceptual diagram of light that passes the second area in the first polarization means and the fourth area in the second polarization means and reaches the imaging element array is shown in (B) of FIG. 2, images formed in the imaging element array by the light shown in (A) and (B) of FIG. 2 is schematically shown in (C) and (D) of FIG. 2. Furthermore, in the description below, the light advancing direction is set to the Z-axis direction, the first direction to the horizontal direction (X-axis direction), and the second direction to the vertical direction (Y-axis direction). In addition, a conceptual diagram of the imaging element array with a Bayer arrangement in the imaging device of Embodiment 1 is shown in FIG. 4.

In the imaging device in Embodiment 1 or Embodiments 2 to 6 to be described below, unit pixel rows composed of $M_0$ (for example, 1920 in Embodiment 1) pixels along the first direction (horizontal direction or X-axis direction) are arranged in $N_0$ (for example, 1080 in Embodiment 1) rows along the second direction (vertical direction or Y-axis direction) orthogonal to the first direction, and the device includes (A) the optical system, and (B) an imaging element array 40 in which imaging elements 43A and 43B are arranged corresponding to each pixel and which converts light passing through the optical system into electric signals. Furthermore, the values of $M_0$ and $N_0$ are essentially arbitrary, and not limited to the values above.

Herein, a pixel group composed of at least one unit pixel row including a unit pixel row selected for every N-th row (where $2 \leq N$)

is set to a first pixel group $PG_1$, imaging elements composing a pixel in the first pixel group $PG_1$ are set to a first imaging element group 41, an imaging element group composed of imaging elements not included in the first imaging element group 41 is set to a second imaging element group 42, and a pixel group constituted by pixels composed of the second imaging element group 42 is set to a second pixel group $PG_2$.

Furthermore, in the imaging device of Embodiment 1, $N=2^n$, and n is a natural number from 1 to 5, and more specifically, n=3.

In Embodiment 1, or Embodiments 2 to 6 to be described later, the optical system includes (a) first polarization means 130, 230, and 330 that polarize light from a subject, and (b) a lens system 20 that converges light from the first polarization means 130, 230, and 330. In addition, the first imaging element group 41 has second polarization means 150 and 250 in the side of light incidence, converts light converged by the lens system 20 into electric signals, and the second imaging element group 42 converts the light converged by the lens system 20 into electric signals. Specifically, the first imaging element group 41 converts light that is converged by the lens system 20 and passes the first polarization means 130, 230, and 330 and the second polarization means 150 and 250 into electric signals. The second imaging element group 42 converts light that is converged by the lens system 20 and passes the first polarization means 130, 230, and 330 into electric signals. The first polarization means 130, 230, and 330 has first areas 131, 231, and 331 and second areas 132, 232, and 332 arranged along the first direction (horizontal direction or X-axis direction).

Furthermore, a polarization state of a first area passing light $L_1$ passing the first areas 131, 231, and 331 and a polarization state of a second area passing light $L_2$ passing the second areas 132, 232, and 332 are different from each other, the second polarization means 150 and 250 has a plurality of third areas 151 and 251 and fourth areas 152 and 252 extending in the first direction (horizontal direction or X-axis direction), a polarization state of a third area passing light $L_3$ passing the third areas 151 and 251 and a polarization state of a fourth area passing light $L_4$ passing the fourth areas 152 and 252 are different from each other, the first area passing light $L_1$ passes the third areas 151 and 251 and then reaches the first imaging element group 41, the second area passing light $L_2$ passes the fourth areas 152 and 252 and then reaches the first imaging element group 41, and accordingly, parallax information is obtained in which the distance between the barycenter $BC_1$ of the first areas 131, 231, and 331 and the barycenter $BC_2$ of the second areas 132, 232, and 332 is set to the base-line length of the parallax of both eyes.

In the imaging device of Embodiment 1 or Embodiments 2 to 6 to be described later, the lens system 20 includes, for example, a capturing lens 21, a diaphragm 22, and an imaging lens 23, and functions as a zoom lens. The capturing lens 21 is a lens for converging light incident from a subject. The capturing lens 21 includes a focus lens for taking the focus, a zoom lens for magnifying a subject, or the like, and generally, is realized by a combination of a plurality of lenses for correcting chromatic aberration or the like. The diaphragm 22 has a function of narrowing down in order to adjust the amount of converged light, and generally, is configured to be combined with a plurality of plate-like blades. At least in the position of the diaphragm 22, light from one point of a subject is parallel light. The imaging lens 23 forms an image on the imaging element array 40 with light passing the first polarization means 130, 230, and 330. The imaging element array 40 is arranged inside a camera main body 11. In the above configuration, an entrance pupil is positioned more in the camera main body side than in the imaging lens 23 side. The imaging device constitutes, for example, a digital still camera, a video camera, or a camcorder.

The camera main body 11 includes, for example, an image processing means 12 and an image storage unit 13, in addition to the imaging element array 40. In addition, right-eye parallax information, left-eye parallax information, and image information are generated based on the electric signals converted by the imaging element array 40. The imaging element array 40 is realized by, for example, a CCD element, a CMOS image sensor, or the like. The image processing means 12 finally creates the parallax information and the image information from the electric signals output from the imaging element array 40 and records in the image storage unit 13.

The first polarization means 130, 230, and 330 are arranged around the diaphragm 22 of the lens system 20. Specifically, the first polarization means 130, 230, and 330 are arranged on positions around the diaphragm 22, if possible, as long as the means do not hinder the operation of the diaphragm 22. Furthermore, the first polarization means 130, 230, and 330 are arranged near the lens system 20 in the state of parallel light when light incident to the lens system 20 is parallel light first and finally converged (forms an image) on the imaging elements 43A and 43B as described above.

In the imaging device 110 of Embodiment 1, the first polarization means 130 includes the first area 131 and the second area 132 arranged along the first direction. Specifically, the external shape of the first polarization means 130 is a circular shape, and the first area 131 and the second area 132 each have semilunar external shapes occupying half of the first polarization means 130. The boundary line between the first area 131 and the second area 132 extends along the second direction. The first polarization means 130 constituted by the combination of two polarization filters separates incident light into two different polarization states. The first polarization means 130 is composed of bilaterally symmetric polarizers as described above, and generates polarized light beams in the linear direction orthogonal to each other or polarized light beams in the rotation direction opposed to each other at two left and right positions in the erecting state of a camera. The first area 131 is a filter that performs polarization for an image of the subject that the right eye is supposed to see (light that the right eye is supposed to receive) in the first pixel group $PG_1$. On the other hand, the second area 132 is a filter that performs polarization for an image of the subject that the left eye is supposed to see (light that the left eye is supposed to receive) in the first pixel group $PG_1$.

Herein, in the imaging device 110 of Embodiment 1, the first area 131 and the second area 132 are constituted by polarizers. In addition, the direction of the electric field of the first area passing light $L_1$ (indicated by a white arrow) and the direction of the electric field of the second area passing light $L_2$ (indicated by a white arrow) are orthogonal to each other (refer to (B) of FIG. 1). Herein, in Embodiment 1, the direction of the electric field of the first area passing light $L_1$ is in parallel with the first direction. Specifically, for example, the first area passing light $L_1$ mostly has a P-wave (TM wave) as a polarization component and the second area passing light $L_2$ mostly has an S-wave (TE wave) as a polarization component. Furthermore, the direction of the electric field of the first area passing light $L_1$ and direction of the electric field of the third area passing light $L_3$ (indicated by white arrows) are in parallel with each other, and the direction of the electric field of the second area passing light $L_2$ and direction of the electric field of the fourth area passing light $L_4$ (indicated by white arrows) are in parallel with each other (refer to (C) of FIG. 1). In addition, the extinction ratio of each polarizer is 3 or greater, and more specifically 10 or greater.

In the imaging device 110 of Embodiment 1, the external shape of the first polarization means 130 is a circular shape with the radius of r=10 mm. In addition, the first area 131 and the second area 132 have semilunar shapes occupying half of the first polarization means 130. Therefore, the distance between the barycenter $BC_1$ of the first area 131 and the barycenter $BC_2$ of the second area 132 is $$[(8r)/(3\pi)]=8.5 \text{ mm.}$$

As a schematic partial cross-sectional diagram is shown in (A) of FIG. 3, and the arrangement state of the wire-grid polarizer 67 is schematically shown in (B) of FIG. 3, the imaging element 43A composing the first imaging element group 41 is composed of, for example, a photoelectric conversion element 61 provided on a silicon semi-conductor substrate 60, and a first flattening film 62, a color filter 63, an on-chip lens 64, a second flattening film 65, an inorganic insulating base layer 66, and the wire-grid polarizer 67 stacked on the photoelectric conversion element 61. In addition, the wire-grid polarizer 67 is constituted by the third area 151 and the fourth area 152. Furthermore, in (B) of FIG. 3, solid lines indicate boundary areas of a pixel, and dotted lines indicate boundary areas of the imaging element 43A. The direction in which a plurality of wires 68 composing the wire-grid polarizer 67 extends is in parallel with the first direction or the second direction. Specifically, in a wire-grid polarizer 67A constituting the third area 151, the direction in which a wire 68A extends is in parallel with the second direction, and in a wire-grid polarizer 67B constituting the fourth area 152, the direction in which a wire 68B extends is in parallel with the first direction. The direction in which the wire 68 extends is a light absorption axis in the wire-grid polarizer 67, and the direction orthogonal to the direction in which the wire 68 extends is a light transmission axis in the wire-grid polarizer 67. The imaging element 43B composing the second imaging element group 42 can be configured or structured to be the same as the imaging element 43A composing the first imaging element group 41 except that a wire-grid polarizer is not provided therein.

As schematically shown in (A) and (B) of FIG. 2, a square-shaped object A is assumed to come into focus of the lens system 20. In addition, a circular-shaped object B is assumed to be positioned closer to the lens system 20 than the object A. The image of the square-shaped object A is formed on the imaging element array 40 in the state of coming into focus. In addition, the image of the circular-shaped object B is formed on the imaging element array 40 in the state of not coming into focus. Then, in the example shown in (A) of FIG. 2, the image of the object B is formed on a position a distance $(+\Delta X)$ apart from the object A to the right side on the imaging element array 40. On the other hand, in the example shown in (B) of FIG. 2, the image of the object B is formed on a position a distance $(-\Delta X)$ apart from the object A to the left side on the imaging element array 40. Therefore, the distances $(2 \times \Delta X)$ are information regarding the depth of the object B. In other words, the blurring amount and blurring direction of an object positioned closer to the imaging device than the object A are different from the blurring amount and blurring direction of another object positioned away from the imaging device, and the blurring amount of the object B is different according to the distance between the object A and object B. In addition, it is possible to obtain a stereoscopic image by setting the distance between the barycentric positions in the shapes of the first area 131 and the second area 132 in the first polarization means 130 to the base-line length of parallax of both eyes. In other words, it is possible to obtain a stereoscopic image from right-eye parallax information (refer to the schematic diagram of (C) of FIG. 2) and left-eye parallax information (refer to the schematic diagram of (D) of FIG. 2) obtained in the first pixel group $PG_1$ as above.

A conceptual diagram of the imaging element array with a Bayer arrangement in the imaging device of Embodiment 1 is shown in FIG. 4. Herein, one pixel is composed of four imaging elements (one red imaging element R that senses red, one blue imaging element B that senses blue, and two green imaging elements G that sense green). In addition, a pixel group constituted by at least one unit pixel row (two unit pixel rows in Embodiment 1) including a unit pixel row selected for every N-th row (where $2 \leq N$, and in Embodiment 1, N=8 as described above) is set to the first pixel group $PG_1$. In other words, in Embodiment 1, the third area 151 is disposed in one unit pixel row arranged along the first direction, and the fourth area 152 which is adjacent to the unit pixel row in the second direction is disposed in one unit pixel row arranged along the first direction. In the first pixel group $PG_1$, for one pixel, one third area 151 or fourth area 152 is disposed, the third area 151 is disposed for all pixels composing one unit pixel row, and the fourth area 152 is disposed for all pixels composing one unit pixel row. In other words, imaging elements composing all pixels in the first pixel group $PG_1$ is set to the first imaging element group 41. Furthermore, the third area 151 and the fourth area 152 extend in the first direction as a whole, but a unit length extending in the first direction and the second direction of the third area 151 and the fourth area 152 is equal to a length along the first direction and the second direction of the imaging element 43A. In addition, by adopting such a configuration, a strip-shaped image extending in the first direction based on light mostly having P-wave components (right-eye parallax information) and a strip-shaped image extending in the first direction based on light mostly having S-wave components are generated along the second direction. Furthermore, in FIG. 4, a vertical line is drawn in the third area 151 and vertical and horizontal lines are drawn in the fourth area 152, but they schematically indicate wires of the wire-grid polarizer 67A and 67B.

In addition, in the imaging method of Embodiment 1 or in Embodiments 2 to 6 to be described later, parallax information for obtaining a stereoscopic image in the first imaging element group 41 is acquired, image information for obtaining images in the second imaging element group 42 is acquired, image information is obtained in pixels from which parallax information is acquired in the first pixel group $PG_1$ (specifically, all pixels in the first pixel group $PG_1$ in Embodiment 1) based on the acquired image information, and then a stereoscopic image is obtained from the parallax information and the image information for all pixels.

In other words, in the first pixel group $PG_1$, a depth map (depth information) is acquired as parallax information based on the amount of parallax generated from electric signals obtained by the first area passing light passing the third area 151 and by the second area passing light passing the fourth area 152. In addition, image information is acquired based on electric signals from all remaining pixel elements 43B (the second imaging element group 42) constituting the imaging element array 40. Such acquisition and processing methods can adopt known methods.

Since the image information and amount of light obtained from each imaging element in the first pixel group PG, constituted by the first imaging element group 41 where the third area 151 and the fourth area 152 are disposed (hereinbelow, collectively referred to as image information) is image information acquired from light passing an area separated into the first area 131 and the second area 132 for acquiring each parallax information, it is not possible to obtain the same image information as the image information of each imaging element in the second imaging element group 42 acquired from light obtained by adding the first area passing light passing the first area 131 and the second area passing light passing the second area 132 without separating the parallax information. For that reason, it is necessary to obtain insufficient or lacking image information based on the image information from each imaging element constituting the second imaging element group 42 of the adjacent first pixel group for each imaging element from which parallax information is acquired in the first pixel group $PG_1$ constituted by the first imaging element group 41 where the third area 151 and the fourth area 152 are disposed. In other words, image information is generated which is the same as the second imaging element group based on an interpolation process for a unit pixel row including the first imaging element group where the third area 151 and the fourth area 152 are disposed. By synthesizing with the addition of the image information in the first imaging element group and the image information in the second imaging element group obtained as above, it is possible to obtain image information without insufficiency or lacking in the entire imaging elements. In addition, it is possible to make parallax emphasized or appropriate with, for example, a parallax detection technology for creating a disparity map by performing stereo-matching from a difference between left-eye parallax information obtained from the third area and right-eye parallax information obtained from the fourth area, and a parallax control technology for arbitrarily generating left-eye images and right-eye images based on the obtained disparity map with image information of the entire imaging elements obtained by the addition of the first imaging element group and the second imaging element group based on an interpolation process.

Specifically, electric signals for obtaining right-eye parallax information are generated in the imaging element 43A by the first area passing light $L_1$ that passes the third area 151 and reaches the imaging element 43A. In addition, electric signals for obtaining left-eye parallax information are generated in the imaging element 43A by the second area passing light $L_2$ that passes the fourth area 152 and reaches the imaging element 43A. Then, both electric signals are output at the same time or alternately in a time series. On the other hand, electric signals for obtaining image information (two-dimensional image information) are generated in the imaging element 43B and output by light that passes the first area 131 and the second area 132 and reaches the imaging element 43B. An imaging process is performed for the output electric signals (electric signals for obtaining the right-eye parallax information, left-eye parallax information, and image information output from the imaging element array 40) by the image processing means 12, and recorded in the image storage unit 13 as parallax information and image information.

FIG. 5 shows a conceptual diagram of the imaging element array that performs a demosaicing process for the electric signals obtained from the imaging element 43B constituting the second imaging element group 42 and has a Bayer arrangement for describing an imaging process for obtaining signal values. Furthermore, FIG. 5 shows an example in which signal values relating to a green imaging element are generated. In a general demosaicing process, an average value of electric signals of neighboring imaging elements with the same color is commonly used. However, when a unit pixel row for obtaining right-eye parallax information and a unit pixel row for obtaining left-eye parallax information are disposed adjoining each other as in Embodiment 1, there is a concern that the original image information is not obtained if neighboring values are used without change. Thus, the demosaicing process is performed in order to prevent such a problem. It is possible to obtain imaging element signal values in each imaging element position by the demosaicing process, but the stage may be put in a kind of a state of omission as described above. In other words, in the first pixel group $PG_1$ where the first imaging element group 41 is disposed, the same image information as that from the second imaging element group 42 is not obtained. For that reason, it is necessary to generate imaging element signal values by interpolation for an area where imaging element signal values do not exist (the first imaging element group 41). As an interpolation method, known methods such as a method using an average of addition of neighboring values or the like can be exemplified. Furthermore, the interpolation process may be performed in parallel with the demosaicing process. Since the number of pixels is completely maintained in the first direction, deterioration in image quality such as a decline in resolution of an overall image is relatively insignificant. In addition, accordingly, it is possible to obtain image information in pixels from which parallax information is acquired in the first pixel group $PG_1$ (to be more specific, all pixels in the first pixel group $PG_1$ in Embodiment 1).

In a Bayer arrangement, the red imaging element R is assumed to be disposed in a position (4,2). At this point, an arithmetic operation expressed by the following formula is performed in order to generate a green imaging element signal value g' corresponding to the position (4,2).

$$g'_{4,2}=(g_{4,1}+g_{4,3}+g_{5,2}+g_{1,2}\times W_3)/(3.0+W_3)$$

Where $g'_{i,j}$ in the left side is a green imaging element signal value in a position (i, j). In addition, $g_{i,j}$ in the right side is a value of an electric signal of the green imaging element in the position (i, j). Furthermore, when a distance ($W_1$) from the target imaging element $G_{4,2}$ to neighboring imaging elements $G_{4,1}$, $G_{4,3}$, and $G_{5,2}$ is each set to, for example, "1.0", "3.0" is a value obtained such that inverses thereof are set to weights, and the weights are summed. In the same manner, $W_3$ is a weight for an electric signal value of the imaging element $G_{1,2}$ separated for three imaging elements, and the value is "⅓" in this case. If the above formula is generalized, it turns into the following formula.

When i is an even number (a signal value of the green imaging element G corresponding to the position of the red imaging element $$g'_{i,j}=(g_{i,j-1}\times W_1+g_{i,j+1}\times W_1+g_{i+1,j}\times W_1+g_{i-3,j}\times W_3)/(W_1\times 3.0+W_3), \quad R):$$

and when i is an odd number (a signal value of the green imaging element G corresponding to the position of the blue imaging element $$g'_{i,j}=(g_{i,j-1}\times W_1+g_{i,j+1}\times W_1+g_{i-1,j}\times W_1+g_{i+3,j}\times W_3)/(W_1\times 3.0+W_3), \quad B):$$

where $W_1=1.0$ and $W_3=\frac{1}{3}$.

It is possible to perform the demosaicing process for the red imaging element R and the blue imaging element B in the same manner.

It is possible to obtain imaging element signal values in each imaging element position by the demosaicing process, but the stage may be put in a kind of a state of omission as described above. In other words, in the first pixel group $PG_1$ where the first imaging element group 41 is disposed, image information the same as that from the second imaging element group 42 is not obtained. For that reason, it is necessary to generate imaging element signal values by interpolation for an area where imaging element signal values do not exist (the first imaging element group 41). As an interpolation method, known methods such as a method using an average of addition of neighboring values or the like can be exemplified. Furthermore, the interpolation process may be performed in parallel with the demosaicing process. Since the image quality is completely maintained in the first direction, deterioration in image quality such as a decline in resolution of an overall image is relatively insignificant. In addition, accordingly, it is possible to obtain image information in pixels from which parallax information is acquired in the first pixel group $PG_1$ (to be more specific, all pixels in the first pixel group $PG_1$ in Embodiment 1).

In addition, a stereoscopic image is obtained from the obtained parallax information and the image information in all pixels. In other words, after right-eye image data and left-eye image data are obtained from the obtained parallax information and the image information in all pixels, a stereoscopic image is displayed based on the right-eye image data and the left-eye image data. Furthermore, such a processing method itself can adopt a known one.

In the imaging method of Embodiment 1, parallax information for obtaining a stereoscopic image is acquired in the first imaging element group, image information for obtaining an image is acquired in the second imaging element group, image information is obtained in a pixel from which the parallax information is acquired in the first pixel group based on the acquired image information, and then a stereoscopic image is obtained from the parallax information and the image information for all pixels. In other words, since the image information for obtaining an image is basically acquired in the second imaging element group, that is to say, light passing the first area and the second area of the first polarization means is incident to the second imaging element group in a mixed state, image information can be obtained by non-polarized light, and as a result, the occurrence of visual field competition can be suppressed. Moreover, since the parallax information for obtaining a stereoscopic image is acquired in some of the pixels, in other words, in the first imaging element group, it is possible to prevent a drastic drop in the amount of light that reaches the imaging element array, in comparison with the case where the parallax information for obtaining a stereoscopic image is acquired in all pixels. In other words, in terms of the intensity 100 of incident natural light, the amount of light that passes the first polarization means 130 and the second polarization means 150 (light that reaches the first imaging element group) is about 25% of the amount of light before being incident to the first polarization means 130 even if the transmittance loss is zero. On the other hand, the amount of light that passes the first polarization means 130 (light that reaches the second imaging element group) does not change from the amount of light that is incident to the first polarization means 130 even if the transmittance loss is zero. For that reason, it is possible to prevent a drastic drop in the amount of light that reaches the overall imaging element array.

Furthermore, with regard to the image quality and number of pixels of an image, the ratio of the image quality and the number of pixels of the depth map is not set to 1:1, but this is because individual subjects are sufficiently large in comparison with pixel resolution power in most captured scenes, and the same distance information resolution power as the pixel resolution power of an image is not necessary for individual subjects as long as there is no distance difference in the same fineness as the pixel resolution power. In addition, if resolution power in the horizontal direction is sufficient in sensing the distance difference, there is little discomfort even when resolution power in the vertical direction is low.

In addition, in Embodiment 1, since the imaging device 110 is constituted by one pair of the first polarization means 130 and the second polarization means 150, and one lens system 20, two different images separated, for example, to the left and right can be generated at the same time, and it is possible to provide an imaging device that is small and monocular, and has a simple configuration and structure, and a small number of constituent components. In addition, since two pairs of the combination of a lens and a polarization filter are not necessary, no deviations or differences occur in zoom, diaphragms, focus, convergence angle, or the like. Moreover, since the base-line length of the parallax of both eyes is relatively short, a natural stereoscopic effect can be obtained. Furthermore, two-dimensional images or three-dimensional images can be easily obtained by adopting a structure resulting from attaching or detaching the first polarization means 130.

Embodiment 2

Embodiment 2 is a modification of Embodiment 1. In Embodiment 1, the direction of the electric field of the first area passing light $L_1$ is set to be in parallel with the first direction. On the other hand, in Embodiment 2, the direction of the electric field of the first area passing light $L_1$ is set to form the angle of 45 degrees with the first direction. In addition, the direction of the electric field of the first area passing light $L_1$ and the direction of the electric field of the third area passing light $L_3$ are in parallel with each other, and the direction of the electric field of the second area passing light $L_2$ and the direction of the electric field of the fourth area passing light $L_4$ are in parallel with each other. States of polarization in the first polarization means 230 and a second polarization means 250 provided in an imaging device of Embodiment 2 are schematically shown in (A) and (B) of FIG. 6.

A conceptual diagram of the imaging element array 40 with a Bayer arrangement is shown in FIG. 7. Also in Embodiment 2, one pixel of the imaging element array 40 is constituted by four imaging elements (one red imaging element R that senses red, one blue imaging element B that senses blue, and two green imaging elements G that sense green). In addition, in the first pixel group $PG_1$, a third area 251 is disposed in one unit pixel row arranged along the first direction, and a fourth area 252 which is adjacent to the unit pixel row in the second direction is disposed in one unit pixel row arranged along the first direction. The third area 251 and the fourth area 252 are disposed along the second direction for every N-th row. Furthermore, the third area 251 and the fourth area 252 extend in the first direction as a whole, but the unit length of the third area 251 and the fourth area 252 is equivalent to the length of one imaging element. In addition, with such a configuration, a strip-shaped image extending in the first direction based on light mostly with P-wave components (right-eye parallax information) and a strip-shaped image extending in the first direction based on light mostly with S-wave components are generated along the second direction. Furthermore, in FIG. 7, oblique lines are drawn inside the third area 251 and the fourth area 252, but they schematically indicate wires of a wire-grid polarizer.

Except for the above points, as an imaging method using the imaging device of Embodiment 2 can be the same as that described in Embodiment 1, detailed description thereof will be omitted. In addition, as the configuration and structure of the imaging device of Embodiment 2 are the same as those of the imaging device 110 described in Embodiment 1, detailed description thereof will be omitted. The configuration and structure of the imaging device of Embodiment 2 can be applied to imaging devices in Embodiments 3 to 6 to be described below.

Embodiment 3

Embodiment 3 is also a modification of Embodiment 1. In a first polarization means 330 of an imaging device of Embodiment 3, a center area 333 is provided between a first area 331 and a second area 332, and a polarization state of a center area passing light that passes the center area 333 does not change from a state before being incident to the center area 333. In other words, the center area 333 is a free-passing state of the polarization.

Incidentally, when incident light passes the first polarization means, the amount of light decreases in proportion to spectral characteristics and extinction ratios, and the brightness becomes darker. Herein, the extinction ratio refers to a ratio of the amount of passing light with the selection of a polarizer and the amount of leaking light by reflection or absorption without the selection of a polarizer. Specifically, for example, in the case of a polarizer that makes P-wave components with the extinction ratio of 10 pass therethrough, for the intensity 100 of incident natural light with P-wave components: S-wave components=50:50, the polarizer transmits light at a ratio of 50 of the P-wave components and 5 of the S-wave components. In addition, in the case of a polarizer that makes P-wave components with the extinction ratio of 1 pass therethrough, the P-wave components are transmitted 100%, but the S-wave components are not transmitted but are all reflected or completely absorbed, and therefore, when average natural light is incident, the brightness becomes about ½. The amount of light that passes the first polarization means 130 and the second polarization means 150 shown in (B) and (C) of FIG. 1 is about 25% of the amount of light before being incident to the first polarization means 130 even if the transmission loss is zero. In addition, when the light that passes the first and the second areas is in a mixed state and incident to the imaging element array 40 in an inseparable state, the base-line length of parallax of both eyes becomes shorter in proportion to the mixed ratio, and left-eye parallax information and right-eye parallax information become the same in a completely mixed state, parallax is not taken, and stereoscopic view is not possible.

In the center area 333 of the first polarization means 330, the light intensity is strong, but the parallax amount is small. Thus, it is possible to increase the light intensity that the imaging element array 40 receives and to secure a sufficient base-line length of parallax of both eyes by adopting the first polarization means 330 of Embodiment 3. As shown by the schematic diagram of the first polarization means 330 in (A) of FIG. 8, when the external shape of the first polarization means 330 is a circular shape, the center area 333 can be a circular shape, and the first area 331 and the second area 332 can be a fan shape with the center angle of 180 degrees surrounding the center area 333. Alternatively, as shown by the schematic diagrams of the first polarization means 330 in (B) and (C) of FIG. 8, the center area 333 can be a rhombic or square shape, and the first area 331 and the second area 332 can be a shape similar to a fan shape with the center angle of 180 degrees surrounding the center area 333. Alternatively, as shown by the schematic diagram of the first polarization means 330 in (D) of FIG. 8, the first area 331, the center area 333, and the second area 332 can be strip shapes extending along the second direction.

Except for the above points, as an imaging method using the imaging device of Embodiment 3 can be the same as that described in Embodiment 1, detailed description thereof will be omitted. In addition, as the configuration and structure of the imaging device of Embodiment 3 can be the same as those of the imaging device 110 described in Embodiment 1, detailed description thereof will be omitted. The configuration and structure of the imaging device of Embodiment 3 can be applied to imaging devices in Embodiments 4 to 6 to be described below.

Embodiment 4

Embodiment 4 is also a modification of Embodiment 1. In Embodiment 4, the relationship between an extinction ratio and parallax is examined. In other words, a synthesized image simulation is preformed for examining, when images separated to the left and right are mixed, if the parallax disappears, in other words, if stereoscopic view is not possible to what extent the images should be mixed by changing extinction ratios from the extinction ratio=∞ (with 0% crosstalk and in a state where left-eye parallax information and right-eye parallax information are completely separated) to the extinction ratio=1 (with 50% crosstalk, in a state where a left-eye image and a right-eye image are completely mixed, and left-eye parallax information and right-eye parallax information are the same parallax information (image)). A part of the result is shown in (A) and (B) of FIG. 9.

Herein, (A) of FIG. 9 shows the state of the extinction ratio=\, and (B) of FIG. 9 shows the state of the extinction ratio=3 (with 25% crosstalk). In the diagrams in the left sides (left-eye images) and diagrams in the right sides (right-eye images) of (A) and (B) of FIG. 9, distances between the solid lines and broken lines extending in the vertical direction are the same. When the diagrams in the left sides (left-eye images) and diagrams in the right sides (right-eye images) of (A) and (B) of FIG. 9 are compared, the positions of the nose of the plaster figure located to the rear side of the apple are slightly different. In addition, when (A) and (B) of FIG. 9 are compared, the difference in the positions of the nose of the plaster figure is small in (B) of FIG. 9, in comparison with (A) of FIG. 9. Although not shown in the diagrams, when the extinction ratio=1, the positions of the nose of the plaster figure located in the rear side of the apple are same in the left-eye images and the right-eye images. In addition, when the extinction ratio=10 (with 10% crosstalk), a difference in the positions of the nose of the plaster figure is small in comparison with (A) of FIG. 9 and large in comparison with (B) of FIG. 9. From the results above, it is determined that the extinction ratio of a polarizer is desirably 3 or greater.

Embodiment 5

Embodiment 5 is also a modification of Embodiment 1. In Embodiment 5, the relationship between specifications and extinction ratios of a wire-grid polarizer is obtained from calculations. Specifically, the relationship between the pitch of the wire constituting a wire-gird polarizer,
the wavelength ($\lambda$)
of incident light, and an extinction ratio is shown in (A) of FIG. 10. Furthermore, the width of a wire is set to ⅓ of the pitch of a wire, the height of a wire to 150 nm, and the length of a wire to infinite. In (A) of FIG. 10, the curve "A" is data in the case of the pitch of 150 nm, the curve "B" is data in the case of the pitch of 175 nm, the curve "C" is data in the case of the pitch of 200 nm, the curve "D" is data in the case of the pitch of 250 nm, and the curve "E" is data in the case of the pitch of 300 nm. In addition, the relationship between the height of a wire constituting the wire-grid polarizer, the wavelength (l) of incident light, and an extinction ratio is shown in (B) of FIG. 10. Furthermore, the width of a wire is set to 50 nm, the length of a wire to infinite, and the pitch of a wire to 150 nm. In (B) of FIG. 10, the curve "A" is data in the case of the height of 250 nm, the curve "B" is data in the case of the height of 200 nm, the curve "C" is data in the case of the height of 150 nm, and the curve "D" is data in the case of the height of 100 nm. In addition, the relationship between the (width/pitch) of a wire constituting the wire-grid polarizer, the wavelength (l) of incident light, and an extinction ratio is shown in (C) of FIG. 10. Furthermore, the width of a wire is set to 50 nm, the height of a wire to 150 nm, and the length of a wire to infinite. In (C) of FIG. 10, the curve "A" is data when the value of (width/pitch) is 0.50, and the curve "B" is data when the value of (width/pitch) is 0.33.

From (A) of FIG. 10, it is determined that the pitch of a wire is desirably equal to or less than 200 nm, the height of a wire is desirably equal to or greater than
$5 \times 10^{-8}$ m (50 nm),
and the value of (width/pitch) of a wire is desirably equal to or greater than 0.33, in order to set the extinction ratio to 10 or greater. Furthermore, the number of wires is preferably 10 or more.

In addition, the relationship between the length of two wires,
the wavelength ($\lambda$)
of incident light, and an extinction ratio is shown in FIG. 11. Furthermore, the width of the wires is set to 50 nm, the height of the wires to 150 nm, and the pitch of the wires to three times the width of the wires. In FIG. 11, "A" is data in the case of the length of
1 μm,
"B" is data in the case of the length of
2 μm,
"C" is data in the case of the length of
3 μm,
"D" is data in the case of the length of
4 μm,
"E" is data in the case of the length of
5 μm,
"F" is data in the case of the length of
6 μm,
and "G" is data in the case of the length of being infinite. From FIG. 11, it is determined that the length of the wires is desirably equal to or longer than
2 μm,
preferably equal to or longer than
3 μm,
in order to set the extinction ratio to 10 or greater. Moreover, for the reason of ease in processing, it is determined that the material composing a wire is desirably aluminum or an aluminum alloy.

Embodiment 6

Embodiment 6 is also a modification of Embodiment 1. A conceptual diagram of an imaging element array with a Bayer arrangement in an imaging device of Embodiment 6 is shown in FIG. 12, but a first pixel group is constituted by one unit pixel row, and one third area 151 and one fourth area 152 are disposed in one pixel. To be more specific, the third area 151 is disposed in one of two green imaging elements G that sense green, the fourth area 152 is disposed in the other within one pixel, and moreover, one third area 151 and one fourth area 152 are disposed in one pixel in the first pixel group constituted by one unit pixel row selected for every N-th row (where N=$2^n$, and in the example shown in the diagram, n=2).

Alternatively, a conceptual diagram of an imaging element array with a Bayer arrangement in a modified example of the imaging device of Embodiment 6 is shown in FIG. 13, but one third area 151 and one fourth area 152 are disposed in one pixel along the first direction. Furthermore, N=8. In addition, a first pixel group is constituted by two unit pixel rows. However, the third area 151 is disposed in one unit pixel row for every second pixel, and the fourth area 152 is disposed in the other unit pixel row for every second pixel. In one unit pixel row, an imaging element where the third area 151 is not disposed is included in the second imaging element group, and in the other unit pixel row, an imaging element where the fourth area 152 is not disposed is included in the second imaging element group.

Except for the above points, as an imaging method using the imaging device of Embodiment 6 can be the same as that described in Embodiment 1, detailed description thereof will be omitted.

Hereinabove, the present invention is described based on preferable embodiments, but the invention is not limited to those embodiments. The configurations and structures of the imaging device and imaging elements described in the embodiments are examples, and can be appropriately modified. For example, as a schematic partial cross-sectional diagram is shown in (A) of FIG. 14, the imaging element 43A can be configured to be composed of the photoelectric conversion element 61 provided on the silicon semiconductor substrate 60, and the first flattening film 62, the inorganic insulating base layer 66, the wire-grid polarizer 67, the second flattening film 65, the color filter 63, and the on-chip lens 64 stacked on the photoelectric conversion element 61. Alternatively, as a schematic partial cross-sectional diagram is shown in (B) of FIG. 14, the imaging element 43A can be configured to be composed of the photoelectric conversion element 61 provided on the silicon semiconductor substrate 60, and the first flattening film 62, the on-chip lens 64, the second flattening film 65, the color filter 63, the inorganic insulating base layer 66, and the wire-grid polarizer 67 stacked on the photoelectric conversion element 61. The imaging element 43B can have the same configuration and structure as those of the imaging element 43A except that the wire-grid polarizer 67 is not provided. In addition, the imaging element may be the surface irradiation type as shown in the drawings, and may be the rear surface irradiation type although not shown in the drawings.

A stereoscopic image is displayed based on the right-eye image data and the left-eye image data obtained by the imaging method of the invention, but as such a display method, a method in which left and right-eye images are displayed respectively by installing a circularly-polarizing or linearly-polarizing filter in two projectors, and images are viewed with circularly-polarized or linearly-polarized glasses corresponding to the display, a lenticular lens method, and a parallax barrier method can be exemplified. Furthermore, if images are viewed without using circularly-polarized or linearly-polarized glasses, general two-dimensional (flat) images can be viewed. In addition, the process procedure described above may be understood as a method with such a series of procedures, and may be understood as a program to cause a computer to execute the series of procedures or a recording medium storing the program. As a recording medium, for example, CDs (Compact Discs), MDs (MiniDiscs), DVDs (Digital Versatile Discs), memory cards, Blu-ray Discs (registered trademark), or the like can be used.

REFERENCE SIGNS LIST $PG_1$ . . . First pixel group, $PG_2$ . . . Second pixel group, 110 . . . Imaging device, 11 . . . Camera main body, 12 . . . Image processing means, 13 . . . Image storage unit, 20 . . . Lens system, 21 . . . Capturing lens, 22 . . . Diaphragm, 23 . . . Imaging lens, 130, 230, and 330 . . . First polarization means, 131, 231, and 331 . . . First area, 132, 232, and 332 . . . Second area, 333 . . . Center area, 40 . . . Imaging element array, 41 . . . First imaging element group, 42 . . . Second imaging element group, 43A and 43B . . . Imaging element, 150 and 250 . . . Second polarization means, 151 and 251 . . . Third area, 152 and 252 . . . Fourth area, 60 . . . Silicon semiconductor substrate, 61 . . . Photoelectric conversion element, 62 . . . First flattening film, 63 . . . Color filter, 64 . . . On-chip lens, 65 . . . Second flattening film, 66 . . . Inorganic insulating base layer, 67, 67A, and 67B . . . Wire-grid polarizer, 68, 68A, and 68B . . . Wire

The invention claimed is:

1. A parallax imaging method comprising:
   receiving, with a first pixel grow of a pixel matrix, a first polarized light of a subject output from a first polarizer and an imaging lens;
   outputting, with the first pixel group, first electrical signals based on the first polarized light of the subject output from the first polarizer and the imaging lens;
   further polarizing, with a second polarizer, the first polarized light of the subject output from the first polarizer and the imaging lens, the second polarizer including a first polarization area and a second polarization area different from the first polarization area, the first polarization area is configured to further polarize the first polarized light in a first direction, the second polarization area is configured to further polarize the first polarized light in a second direction different from the first direction;
   receiving, with a second pixel group of the pixel matrix, the first polarized light that is further polarized in the first direction by the first polarization area and the first polarized light that is further polarized in the second direction by the second polarization area;
   outputting, with the second pixel group, second electrical signals based on the polarized light that is further polarized in the first direction and the first polarized light that is further polarized in the second direction;
   receiving, with an imaging processor, the first electrical signals and the second electrical signals;
   generating, with the imaging processor, parallax information based on the first electrical signals;
   generating, with the imaging processor, image information based on the second electrical signals; and
   generating, with the imaging processor, one or more stereoscopic images based at least in part on the parallax information and the image information.

2. The parallax imaging method of claim 1, wherein the second pixel group of the pixel matrix includes at least a pixel row, and the first pixel group of the pixel matrix includes pixel rows that are not included in the second pixel group.

3. The parallax imaging method of claim 1, wherein the second pixel group of the pixel matrix includes at least a pixel row for every N-th row, where N≥2, the first pixel group of the pixel matrix comprises pixel rows not equal to every N-th row.

4. The parallax imaging method of claim 3, wherein an upper limit of N is N=2n, where n is a natural number from 1 to 5.

5. The parallax imaging method of claim 4, wherein n=3.

6. The parallax imaging method of claim 1, wherein the first direction is orthogonal to the second direction.

7. The parallax imaging method of claim 1, wherein the first polarized light of the subject output from the first polarizer and the imaging lens has been polarized by the first polarizer having a first area with a first polarization state and a second area with a second polarization state that is different than the first polarization state,
   wherein the first area has a first barycenter and the second area has a second barycenter, and
   wherein a distance between the first barycenter and the second barycenter is a baseline length of parallax of both eyes.

8. A parallax imaging apparatus comprising:
   a pixel matrix including a first pixel group and a second pixel group different from the first pixel group,
   wherein the first pixel group is configured to
   receive a first polarized light of a subject output from a first polarizer and an imaging lens, and
   output first electrical signals based on the first polarized light of the subject output from the first polarizer and the imaging lens;

a second polarizer including a first polarization area and a second polarization area different from the first polarization area, the first polarization area is configured to further polarize the first polarized light of the subject output from the first polarizer and the imaging lens in a first direction, the second polarization area is configured to further polarize the first polarized light of the subject output from the first polarizer and the imaging lens in a second direction different from the first direction, wherein the second pixel group is configured to receive the first polarized light that is further polarized in the first direction by the first polarization area and the first polarized light that is further polarized in the second direction by the second polarization area, and output second electrical signals based on the first polarized light that is further polarized in the first direction and the first polarized light that is further polarized in the second direction; and an imaging processor configured to
receive the first electrical signals and the second electrical signals,
generate parallax information based on the first electrical signals,
generate image information based on the second electrical signals, and
generate one or more stereoscopic images based at least in part on the parallax information and the image information.

9. The parallax imaging apparatus of claim 8, wherein the parallax imaging apparatus is one of a digital camera, a personal computer, a mobile terminal equipment, a video camera, or a game machine.

10. The parallax imaging apparatus of claim 8, wherein the second pixel group of the pixel matrix includes at least a pixel row, and the second first pixel group of the pixel matrix includes pixel rows that are not included in the first second pixel group.

11. The parallax imaging apparatus of claim 8, wherein the first second pixel group includes of at least a pixel row for every N-th row, where N≥2, and the second first pixel group comprises pixel rows not equal to every N-th row.

12. The parallax imaging apparatus of claim 8, wherein the second pixel group of the pixel matrix includes at least a pixel row, and the first pixel group of the pixel matrix includes pixel rows that are not included in the second pixel group.

13. The parallax imaging apparatus of claim 8, wherein the second pixel group of the pixel matrix includes at least a pixel row for every N-th row, where N≥2, the first pixel group of the pixel matrix comprises pixel rows not equal to every N-th row.

14. The parallax imaging apparatus of claim 13, wherein an upper limit of N is N=2n, where n is a natural number from 1 to 5.

15. The parallax imaging apparatus of claim 14, wherein n=3.

16. The parallax imaging apparatus of claim 8, wherein the second direction is orthogonal to the first direction.

17. The parallax imaging apparatus of claim 8,
wherein the first polarized light of the subject output from the first polarizer and the imaging lens has been polarized by the first polarizer having a first area with a first polarization state and a second area with a second polarization state that is different than the first polarization state, wherein the first area has a first barycenter and the second area has a second barycenter, and wherein a distance between the first barycenter and the second barycenter is a baseline length of parallax of both eyes.

18. A parallax imaging system comprising:
a pixel matrix including a first pixel group and a second pixel group different from the first pixel group, the first pixel group is configured to
receive a first polarized light of a subject output from a first polarizer and an imaging lens, and
output first electrical signals based on the first polarized light of the subject output from the first polarizer and the imaging lens; and
a second polarizer including a first polarization area and a second polarization area different from the first polarization area, the first polarization area is configured to further polarize the first polarized light of the subject output from the first polarizer and the imaging lens in a first direction, the second polarization area is configured to further polarize the first polarized light of the subject output from the first polarizer and the imaging lens in a second direction different from the first direction;
wherein the second pixel group is configured to output second electrical signals based on the first polarized light that is further polarized in the first direction by the first polarization area and the first polarized light that is further polarized in the second direction by the second polarization area,
an imaging processor configured to
receive the first electrical signals and the second electrical signals,
generate parallax information based on the first electrical signals,
generate image information based on the second electrical signals, and
generate one or more stereoscopic images based at least in part on the parallax information and the image information.

19. The parallax imaging system of claim 18, wherein the second pixel group of the pixel matrix includes at least a pixel row, and
the first pixel group of the pixel matrix includes pixel rows that are not included in the second pixel group.

20. The parallax imaging system of claim 18, wherein the second pixel group of
the pixel matrix includes at least a pixel row for every N-th row, where N≥2,
the first pixel group of the pixel matrix comprises pixel rows not equal to every N-th row.

21. The parallax imaging system of claim 18, wherein
wherein the first polarized light of the subject output from the first polarizer and the imaging lens has been polarized by the first polarizer having a first area with a first polarization state and a second area with a second polarization state that is different than the first polarization state,
wherein the first area has a first barycenter and the second area has a second barycenter, and
wherein a distance between the first barycenter and the second barycenter is a baseline length of parallax of both eyes.

22. A parallax imaging apparatus comprising:
a plurality of pixels including a first pixel group and a second pixel group different from the first pixel group, the first pixel group is configured to receive a first polarized light of a subject output from a first polarizer and an imaging lens, and output first electrical signals based on the first polarized light of the subject output from the first polarizer and the imaging lens; and a second polarizer including a first polarization area and a second polarization area different from the first polarization area, the first polarization area is configured to further polarize a polarized light the first polarized light of a subject the subject output from the first polarizer and the imaging lens in a first direction, the second polarization-area is configured to further polarize the first polarized light of the subject output from the—first polarizer and the imaging lens in a second direction different from the first direction;

wherein the second pixel group is configured to
receive the first polarized light that is further polarized in the first direction from the second polarizer,
receive the first polarized light that is further polarized in the second direction from the second polarizer, and
output second electrical signals based on the first polarized light that is further polarized in the first direction and the first polarized light that is further polarized in the second direction.

23. The parallax imaging apparatus of claim 22,
wherein the first polarized light of the subject output from the first polarizer and the imaging lens has been polarized by the first polarizer having a first area with a first polarization state and a second area with a second polarization state that is different than the first polarization state,
wherein the first area has a first barycenter and the second area has a second barycenter, and
wherein a distance between the first barycenter and the second barycenter is a baseline length of parallax of both eyes.

24. A non-transitory computer readable medium storing a program code for a parallax imaging process, the program code being executable by an imaging processor to perform operations comprising:
receiving first electrical signals from a first pixel group of a pixel matrix, the first electrical signals are based on a first polarized light of a subject output from a first polarizer and an imaging lens;
receiving first second electrical signals from a first second pixel group of the pixel matrix, the first second electrical signals are based on a further polarization of a polarized the first polarized light of a subject the subject output from an imaging the first polarizer and the imaging lens in a first direction and a second further polarization the first polarized light of the subject output from the first polarizer and the imaging lens in a second direction different from the first direction;
generating parallax information based on the first electrical signals;
generating image information based on the second electrical signals; and
generating one or more stereoscopic images based at least in part on the parallax information and the image information.

25. The non-transitory computer readable medium of claim 24,
wherein the first polarized light of the subject output from the first polarizer and the imaging lens has been polarized by the first polarizer having a first area with a first polarization state and a second area with a second polarization state that is different than the first polarization state,
wherein the first area has a first barycenter and the second area has a second barycenter, and
wherein a distance between the first barycenter and the second barycenter is a base-line length of parallax of both eyes.

* * * * *